United States Patent
Muto et al.

(10) Patent No.: US 11,603,114 B2
(45) Date of Patent: Mar. 14, 2023

(54) APPARATUS FOR GENERATION OF DATA OF TRAVEL PATH INSIDE INTERSECTION, PROGRAM FOR GENERATION OF DATA OF TRAVEL PATH INSIDE INTERSECTION, AND STORAGE MEDIUM

(71) Applicant: DENSO CORPORATION, Kariya (JP)

(72) Inventors: Shigehiro Muto, Kariya (JP); Tomoo Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 16/905,451

(22) Filed: Jun. 18, 2020

(65) Prior Publication Data

US 2020/0317221 A1 Oct. 8, 2020

Related U.S. Application Data

(63) Continuation of application No. PCT/JP2018/037405, filed on Oct. 5, 2018.

(30) Foreign Application Priority Data

Dec. 22, 2017 (JP) .............................. JP2017-246280

(51) Int. Cl.
*B60W 60/00* (2020.01)

(52) U.S. Cl.
CPC ....... *B60W 60/001* (2020.02); *B60W 2554/80* (2020.02)

(58) Field of Classification Search
CPC ..................... B60W 60/001; B60W 2554/80
See application file for complete search history.

(56) References Cited

FOREIGN PATENT DOCUMENTS

| JP | 2008256620 A | * | 10/2008 | |
|----|--------------|---|---------|--------------|
| JP | 2009276224 A | * | 11/2009 | ... G01C 21/30 |
| JP | 2010026875 A |   | 2/2010  | |
| JP | 2017097088 A |   | 6/2017  | |
| JP | 2017165156 A | * | 9/2017  | ... G01C 21/34 |

* cited by examiner

*Primary Examiner* — Vivek D Koppikar
*Assistant Examiner* — Jeffrey R Chalhoub
(74) *Attorney, Agent, or Firm* — Harness, Dickey & Pierce, P.L.C.

(57) ABSTRACT

A travel path data generation apparatus for generating travel path data inside an intersections for automated driving includes a travel path data generator that generates the data of the travel path in such a way that, using an absolute trajectory of actual traveling of a vehicle inside the intersection, the travel path data generator fits an estimated trajectory of the actual traveling of the vehicle inside the intersection into data of lane network connected to the intersection.

8 Claims, 20 Drawing Sheets

APPARATUS FOR GENERATION OF DATA OF TRAVEL PATH INSIDE INTERSECTION, PROGRAM FOR GENERATION OF DATA OF TRAVEL PATH INSIDE INTERSECTION, AND STORAGE MEDIUM

CROSS-REFERENCE OF RELATED APPLICATION

This application is a continuation application of PCT/JP2018/037405 filed on Oct. 5, 2018, which designated the U.S. and claims the benefit of priority from Japanese application No. 2017-246280 filed on Dec. 22, 2017. The entire disclosures of all of the above applications are incorporated herein by reference.

FIELD

The present disclosure relates to an apparatus for generating data of travel paths inside intersections, a program for generating data of travel paths inside intersections, and a storage medium.

BACKGROUND

There is a method of measuring shape and position of a road with high accuracy by using dedicated vehicles, and generating data of travel paths for automated driving. In principle, this method in principle requires a huge amount of work by expensive sensors and man power, and can only generate travel path data in a limited range such as a highway or a motorway. Therefore, it is not possible to generate travel path data for local roads or the like, and it is not possible to create travel path data for intersections. Under such circumstances, it is desired to establish a technology for generating data of travel paths inside intersections.

SUMMARY

The present disclosure provides a travel path data generation apparatus, a travel path data generation program and a storage medium.

In one example, a travel path data generation apparatus includes a travel path data generator that generates data of a travel path inside an intersection in such a way that, using an absolute trajectory of actual traveling of a vehicle inside the intersection, the travel path data generator fits an estimated trajectory of the actual traveling of the vehicle inside the intersection into data of lane network connected to the intersection.

BRIEF DESCRIPTION OF DRAWINGS

Objects, features and advantages of the present disclosure will become more apparent from the following detailed description made with reference to the accompanying drawings. In the drawings.

DETAILED DESCRIPTION

There is a first method which a map data updating method in which a new road is estimated by using a GPS trajectory representing GPS (Global Positioning System) positions of a vehicle as an absolute trajectory and a connection between the new road and an existing road is estimated. There is a second method which is a method of generating data of a travel path inside an intersection, in which an enter line from which the intersection is entered and an exit lane to which the intersection is exited are connected by an arc (a quadratic Bezier curve).

The first method has such a problem that the GPS positions are widely scattered and the travel path data generated by the above method is inferior in accuracy. The second method is unrealistic because actual vehicle travel paths inside intersections vary according to intersection shape and it is highly likely that the travel path data generated by the above-described method may deviate from actual travel trajectories.

It is an object of the present disclosure to provide a travel path data generation apparatus, a travel path data generation program and a storage medium capable of appropriately generating data of travel paths inside intersections for automated driving.

According to one aspect of the present disclosure, a travel path data generator generates the data of the travel path in such a way that, using an absolute trajectory of actual traveling of a vehicle inside the intersection, the travel path data generator fits an estimated trajectory of the actual traveling of the vehicle inside the intersection into data of lane network connected to the intersection.

Specifically, the data of the travel path is generated in such a way that, using an absolute trajectory of actual traveling of a vehicle inside the intersection, an estimated trajectory of the actual traveling of the vehicle inside the intersection is fitted into data of lane network connected to the intersection, unlike a conventional method of generating inside-intersection travel path data using only the absolute trajectory of actual traveling of a vehicle inside an the intersection. Because of the fitting of the estimated trajectory into the lane network data using the absolute trajectory, it is possible to optimize a connection between the data of the travel path data inside the intersection and the lane network data connected to the intersection. As a result, it is possible to appropriately generate the data of travel paths inside intersections for automated driving.

Figure 1:
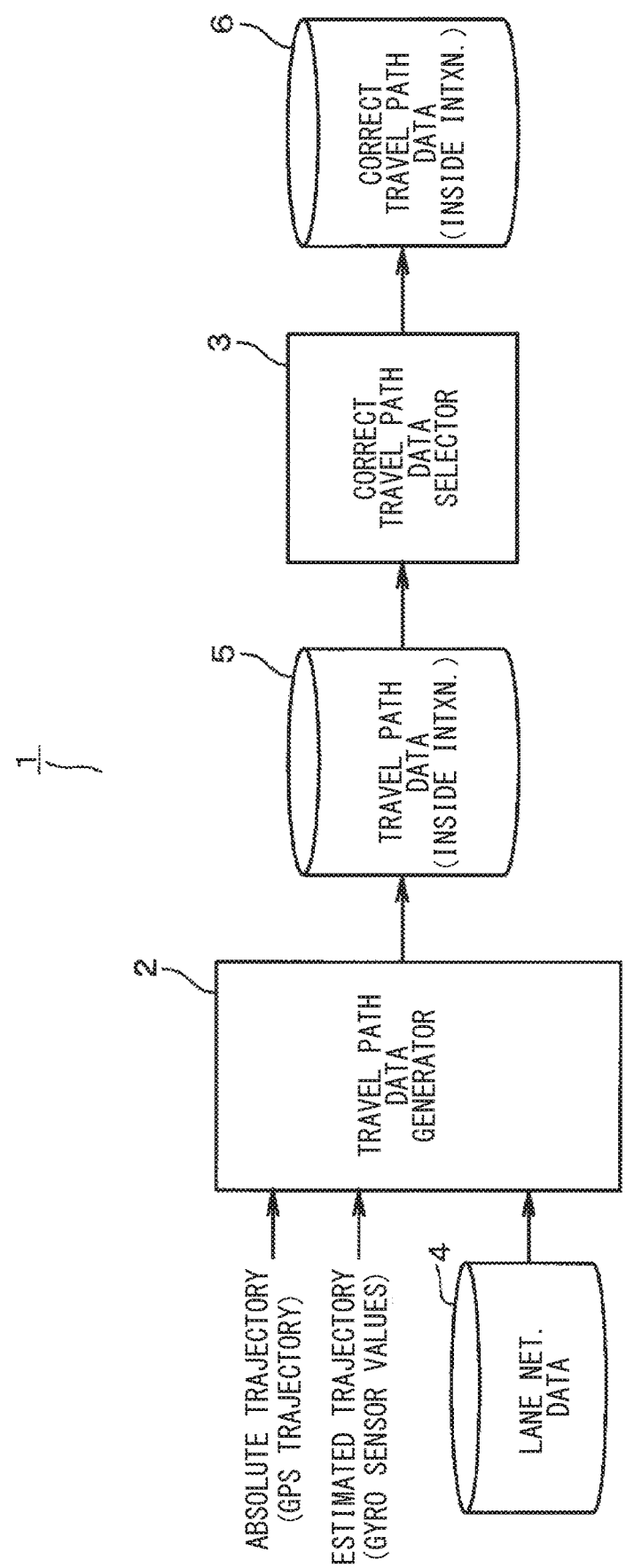
FIG. 1 is a functional block diagram illustrating an overall configuration of an embodiment.

Now, an embodiment will be described below with reference to the drawings. As shown in FIG. 1, a travel path data generation apparatus 1 is an apparatus that generates data of travel paths inside intersections for automated driving, and includes a travel path data generator 2 and a correct travel path data selector 3. The travel path data generator 2 receives inputs of absolute trajectories and estimated trajectories acquired from vehicles and receives inputs of lane network data stored in a lane network data storage unit 4, and generates data of travel paths inside intersections. The absolute trajectory is, for example, a GPS trajectory representing GPS positions. The estimated trajectory is, for example, a trajectory represented by sensor values of a gyro sensor. The lane network data are data of travel paths outside intersections. The travel path data generator 2 outputs the generated data of travel paths and stores this inside-intersection travel path data in a travel path data storage unit 5. The correct travel path data selector 3 receives inputs of the data of multiple travel paths inside an intersection stored in the travel path data storage unit 5 and selects the data of a correct travel path from the data of multiple travel paths. Thereafter, the correct travel path data selector 3 outputs the selected correct travel path data and stores this correct travel path data in a correct travel path data storage unit 6.

Figure 2:
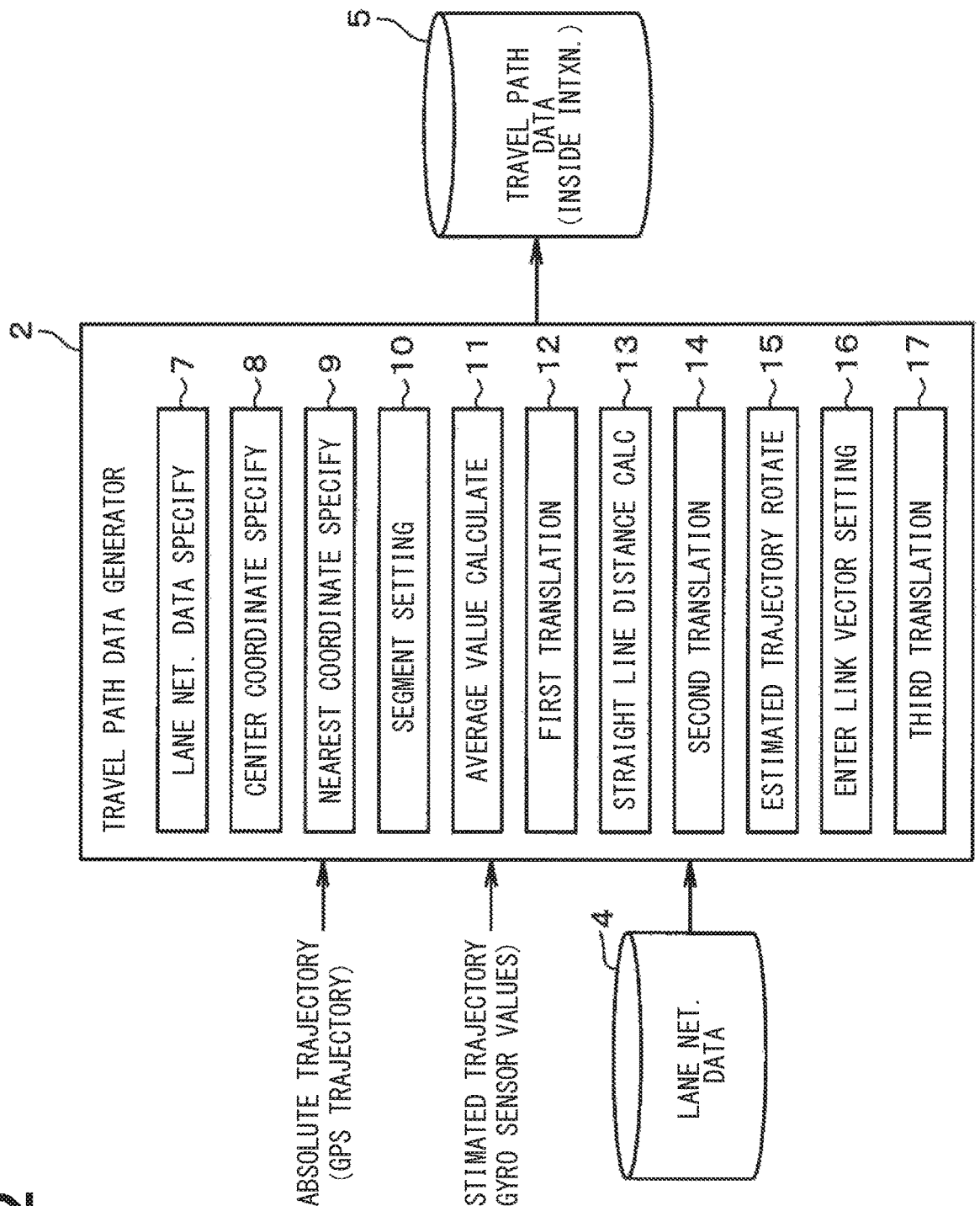
FIG. 2 is a functional block diagram of a travel path data generator.
Figure 3:
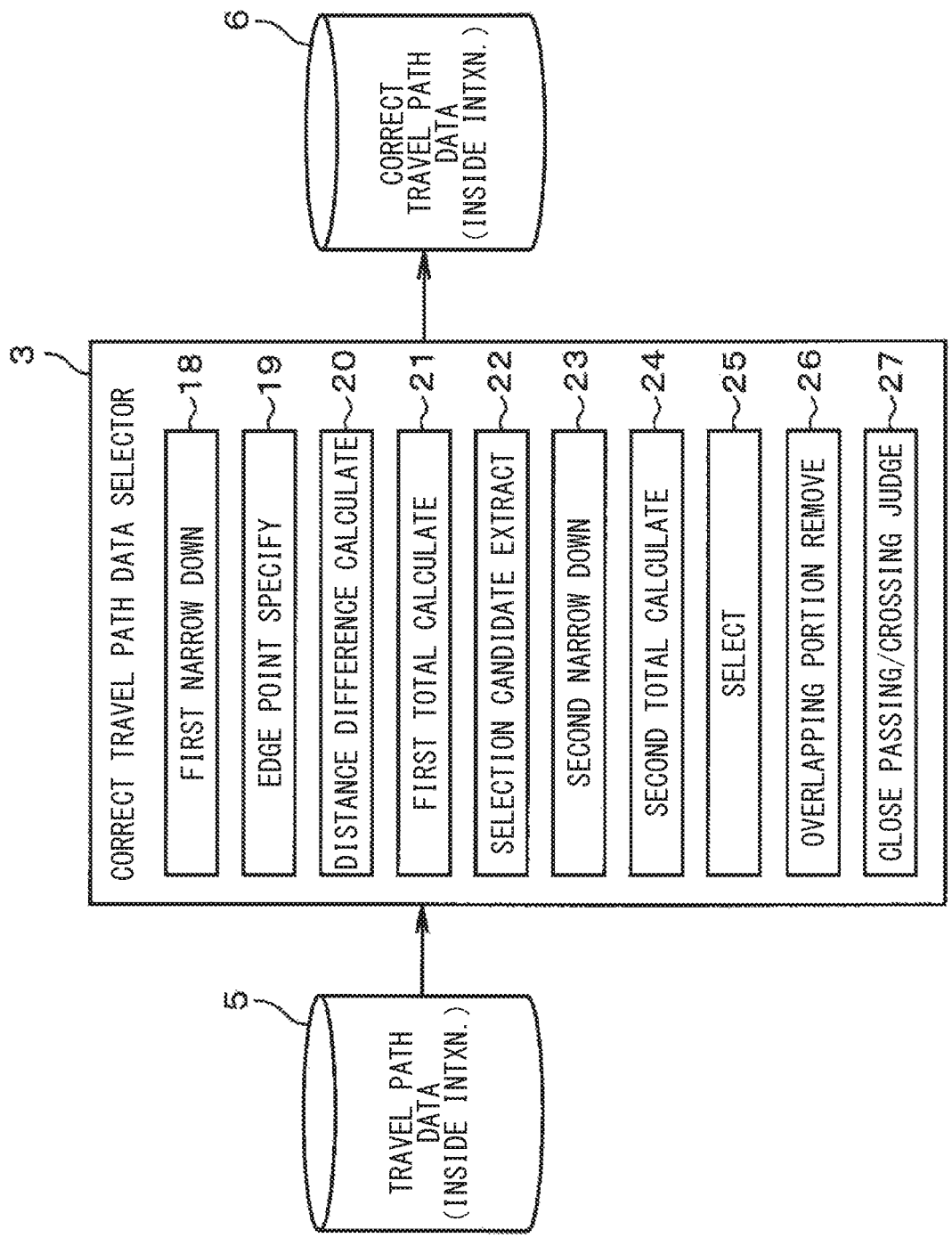
FIG. 3 is a functional block diagram of a correct travel path data selector.

As shown in FIG. 2, the travel path data generator 2 includes a lane network data specifying unit 7, a center coordinate specifying unit 8, a nearest coordinate specifying unit 9, a segment setting unit 10, an average value calculation unit 11, a first translation unit 12, a straight line distance calculation unit 13, a second translation unit 14, an estimated trajectory rotation unit 15, an enter link vector setting unit 16, and a third translation unit 17. As shown in FIG. 3, the correct travel path data selector 3 includes a first narrow-down unit 18, an edge point specifying unit 19, a distance difference calculation unit 20, a first total value calculation unit 21, and a selection candidate extraction unit 22, a second narrow-down unit 23, a second total value calculation unit 24, a selecting unit 25, an overlapping portion removing unit 26, and a close-passing crossing judgment unit 27. These functional blocks are implemented by a microcomputer comprising a CPU (Central Processing Unit), a ROM (Read Only Memory), a RAM (Random Access Memory), and an I/O (Input/Output). The microcomputer executes a computer program stored in a non-transitory tangible storage medium to execute processing corresponding to the computer program, and controls overall operation of the travel path data generation apparatus 1. The computer program executed by the microcomputer includes a travel path data generation program.

First, a respective functional block of the travel path data generator 2 will be described. The lane network data specifying unit 7 reads the lane network data stored in the lane network data storage unit 4. Based on the read lane network data, the lane network data specifying unit 7 specifies enter-side lane network data which is data of lane network from which an intersection is entered, and specifies exit-side lane network data which is data of lane network to which the intersection is exited.

The center coordinate specifying unit 8 specifies an intersecting point between a line provided by extending the enter-side lane network data and a line provided by extending an exit-side lane network data and specifies the intersecting point as the center coordinate point of the intersection. The nearest coordinate specifying unit 9 acquires the absolute trajectory provided from the vehicle, and specifies, among multiple coordinate points constituting the acquired absolute trajectory, a coordinate point nearest to the center of the intersection specified by the center coordinate specifying unit 8.

For an enter-side absolute trajectory being an enter portion of the absolute trajectory, the segment setting unit 10 sets a trajectory acquisition segment and an fitting segment based on the nearest coordinate point specified by the nearest coordinate specifying unit 9. For an exit-side absolute trajectory being an exit portion of the absolute trajectory, the segment setting unit 10 sets a trajectory acquisition segment and a fitting segment based on the nearest coordinate point specified by the nearest coordinate specifying unit 9. The average value calculation unit 11 acquires the estimated trajectory provided from the vehicle and calculates an average value of distance differences between: the fitting segment for the enter-side absolute trajectory set by the segment setting unit 10; and an enter-side estimated trajectory which is a portion of the estimated trajectory corresponding to the fitting segment for the enter-side absolute trajectory.

The first translation unit 12 translates the estimated trajectory by the average value of the distance differences calculated by the average value calculation unit 11. The straight line distance calculation unit 13 sets the midpoint of the fitting segment of the enter-side estimated trajectory as a rotation reference point, and calculates the straight line distance from the rotation reference point to the enter-side lane network data. The second translation unit 14 translates the estimated trajectory by the straight line distance calculated by the straight line distance calculation unit 13.

The estimated trajectory rotation unit 15 rotates the estimated trajectory so that a difference in distance between the fitting segment of the enter-side estimated trajectory and the enter-side lane network data is minimized. The enter link vector setting unit 16 sets an enter link vector which is from the start point to the end point of the fitting segment of the enter-side estimated trajectory. The third translation unit 17 translates the estimated trajectory in the direction of the enter link vector set by the enter link vector setting unit 16 so that a distance difference between the exit-side estimated trajectory and the exit-side lane network data is minimized . . . .

Next, a respective functional block of the correct travel path data selector 3 will be described. The first narrow-down unit 18 narrows down the data of a plurality of travel paths according to the vehicle speed. The edge point specifying unit 19 specifies an edge point of the enter-side lane network data. The distance difference calculation unit 20 selects data of one travel path from the data of a plurality of travel paths as an evaluation target and selects the data of all the remaining travel paths as comparison target(s). The distance difference calculation unit 20 calculates a distance difference between the evaluation target travel path data and the comparison target travel path data at predetermined intervals from the edge point specified by the edge point specifying unit 19 to a calculation segment.

The first total value calculation unit 21 calculates a total value of the distance differences calculated at the predetermined intervals. From the plurality of travel path data, the selection candidate extraction unit 22 extracts, as a selection candidate, the travel path data for which the total value of the distance differences calculated by the first total value calculation unit 21 satisfies the first predetermined condition. The second narrow-down unit 23 narrows down the plurality of travel path data according to travel path curvature. The second total value calculation unit 24 calculates a total value of an enter-side distance difference and an exit-side distance difference wherein the enter-side distance difference is a distance difference between the enter-side lane network data and enter-side travel path data being a portion of the travel path data extracted as the selection candidate from which portion the intersection is entered, and the exit-side distance difference is a distance difference between the exit-side lane network data and exit-side travel path data being a portion of the travel path data extracted as the selection candidate to which portion the intersection is exited.

The selecting unit 25 selects, from among the data of a plurality of travel paths extracted as the selection candidates, correct data path data which is the data of a travel path for which the total value of the enter-side distance difference and the exit-side distance difference calculated by the second total value calculation unit 24 satisfies a second predetermined condition. The overlapping portion removing unit 26 removes portions of the correct travel path data selected by the selecting unit 25, wherein the removed portions are portions overlapping the enter-side lane network data and the exit-side lane network data. The close-passing crossing judgement unit 27 judges the correct travel path passing close to and/or crossing another correct travel path.

Next, operation of the above configuration will be described with reference to FIGS. 4 to 30. The travel path data generation apparatus 1 executes a travel path data generation program to perform a travel path data generation process and a correct travel path data selection process. Hereinafter, the processes will be described in turn.

(1) Travel Path Data Generation Process

Figure 4:
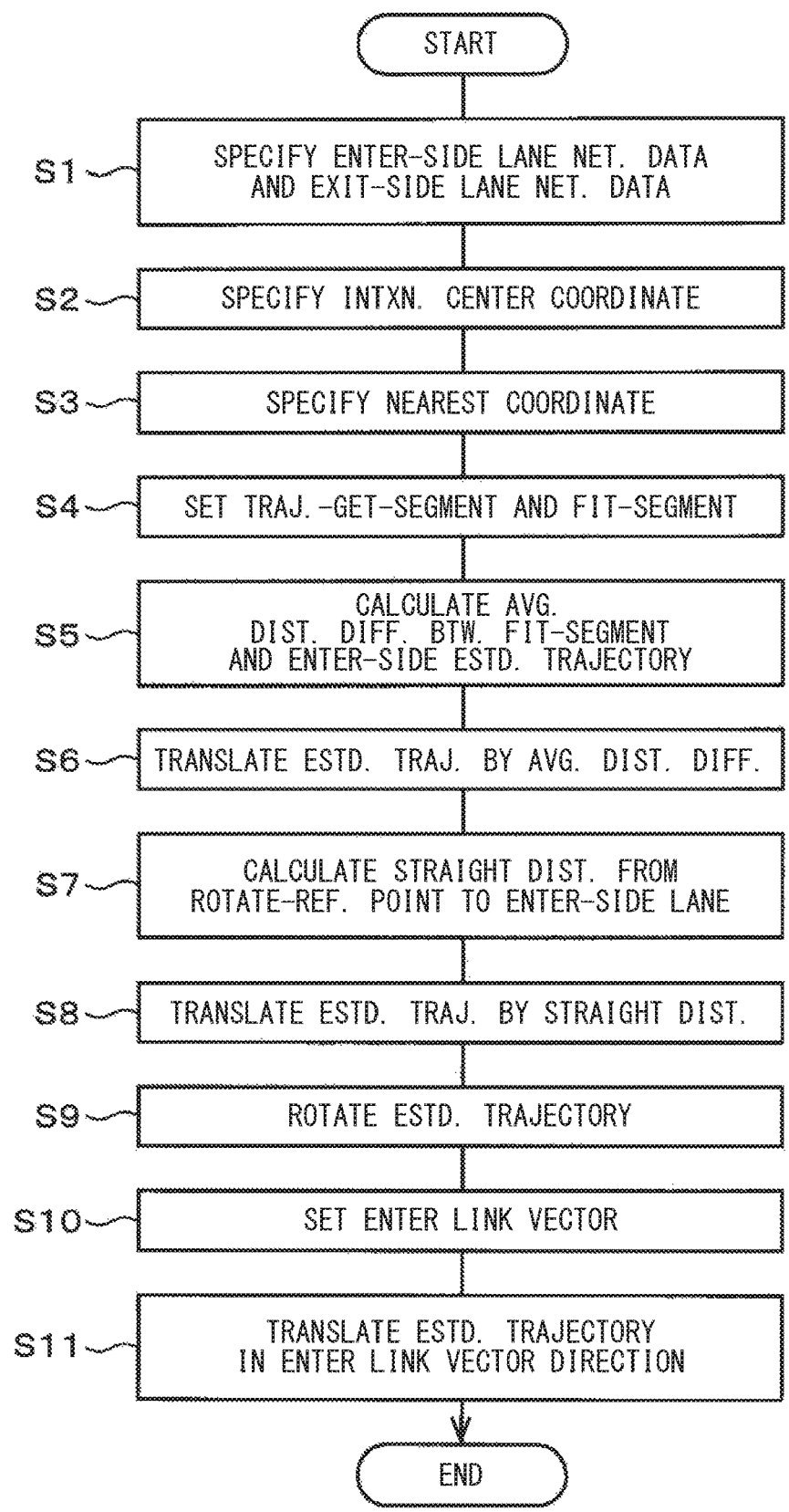
FIG. 4 is a flowchart illustrating a travel path data generation process.
Figure 5:
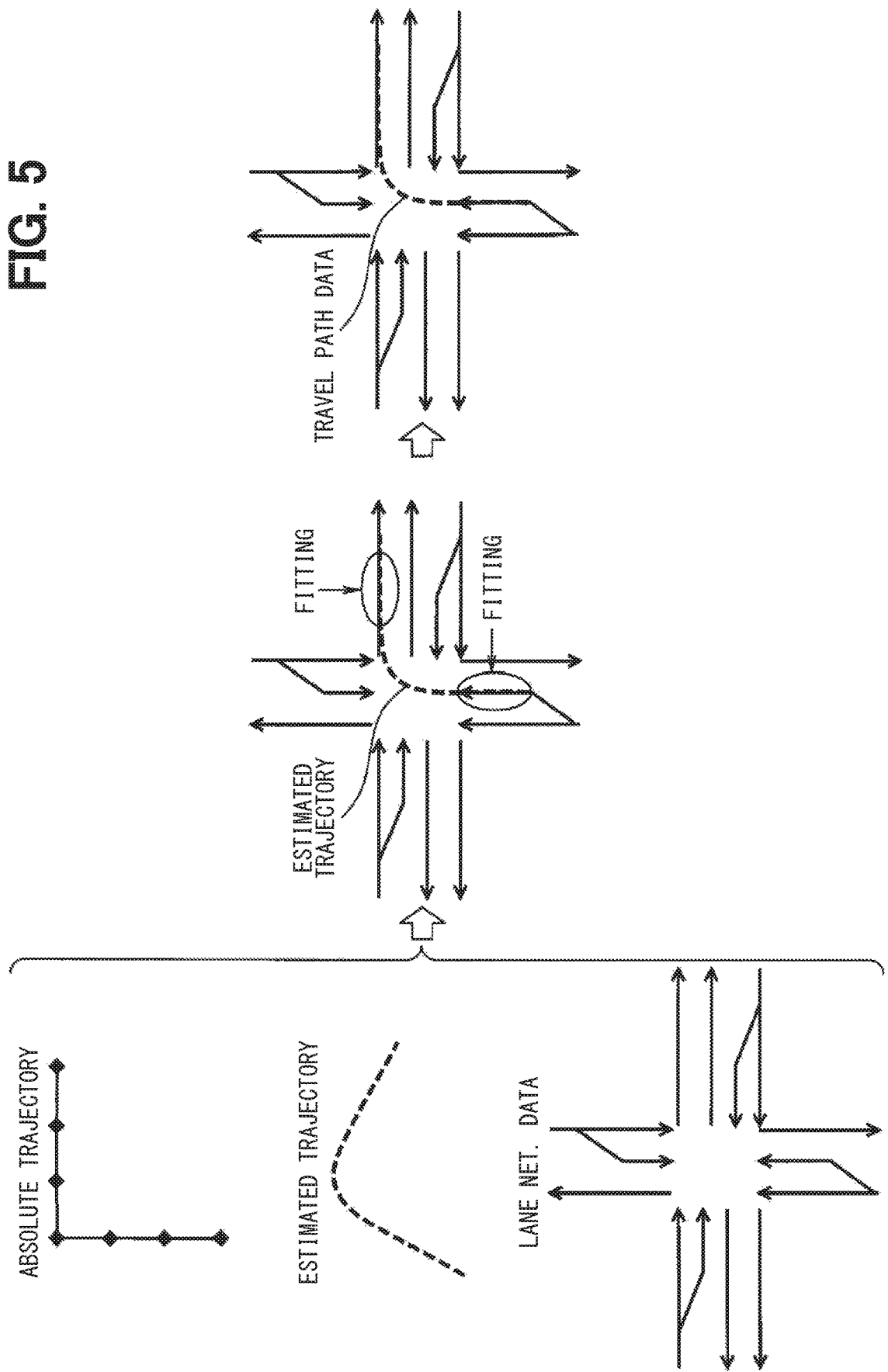
FIG. 5 is a diagram illustrating a manner of generation travel path data.

In the travel path data generation apparatus 1, the travel path data generator 2 performs the travel path data generation process shown in FIG. 4 in response to a start event of the travel path data generation process being met. As shown in FIG. 5, the travel path data generator 2 receives inputs of: the absolute trajectory and the estimated trajectory acquired from the vehicle; and the lane network data stored in the lane network data storage unit, and generates the data of a travel path inside an intersection and outputs the generated travel path data. The processing executed by a respective functional block of the travel path data generator 2 will be described below.

Figure 6:
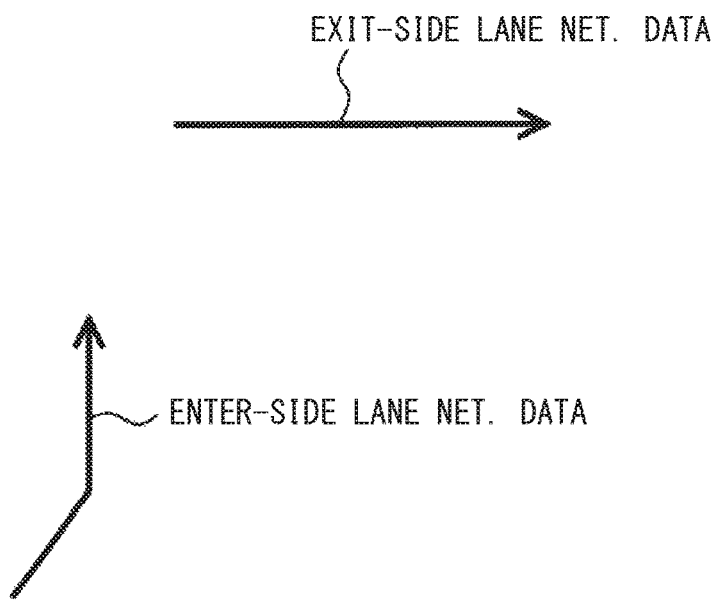
FIG. 6 is a diagram illustrating a manner of specifying lane network data.

First, the lane network data specifying unit 7 reads the lane network data stored in the lane network data storage unit 4. Based on the read lane network data, as shown in FIG. 6, the lane network data specifying unit 7 specifies, from among the lane network data representing enter lanes of intersections and exit lanes from the intersections, enter-side lane network data representing enter lane(s) to a certain intersection and exit-side lane network data representing exit lane(s) from the certain intersection which is the target for the generation of the travel data (S1, corresponding to a lane network data specifying process).

Figure 7:
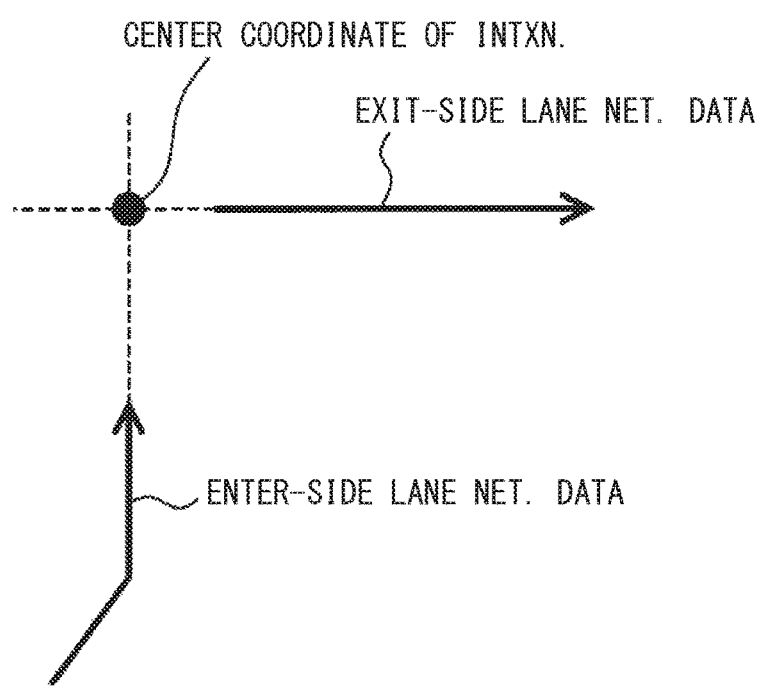
FIG. 7 is a diagram illustrating a manner of specifying a center coordinate point of an intersection.

Next, as shown in FIG. 7, the central coordinate specifying unit 8 specifies, as the center coordinate point of the intersection, an intersecting point between an extended line of the enter-side lane network data and an extended line of the exit-side lane network data identified by the lane network data specifying unit 7 (S2, corresponding to a center coordinate specifying process).

Figure 8:
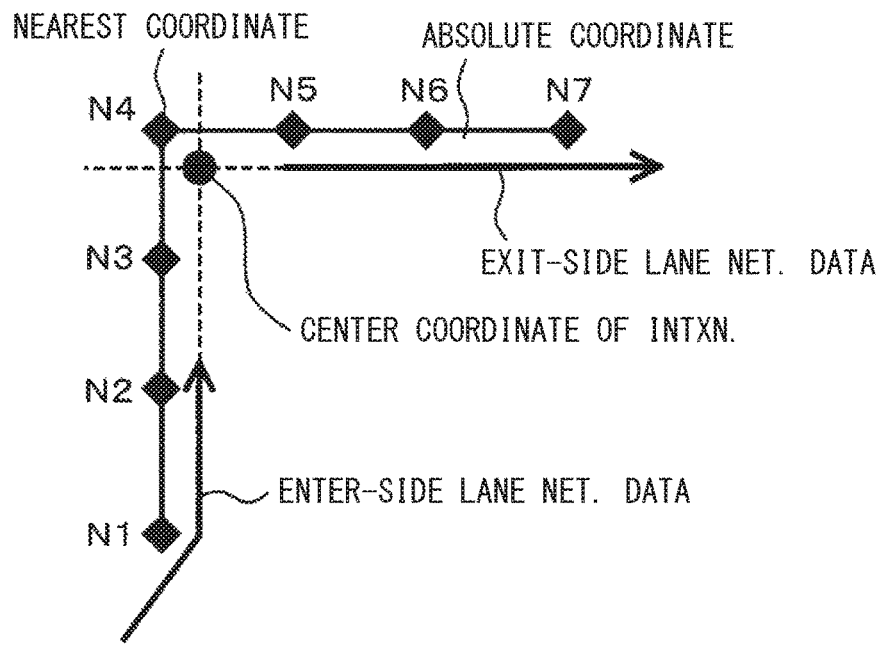
FIG. 8 is a diagram illustrating a manner of specifying the nearest coordinate point.

Next, as shown in FIG. 8, the nearest coordinate specifying unit 9 acquires the absolute trajectory provided from the vehicle and specifies, from among multiple coordinate points forming the absolute trajectory, a coordinate point nearest to the center coordinate point of the intersection as the nearest coordinate point (S3, corresponding to a nearest coordinate specifying process). Specifically, from among the GPS coordinate points "N1" to "N7" forming the GPS trajectory, the nearest coordinate specifying unit 9 specifies the GPS coordinate point "N4" as the nearest coordinate point, which is nearest to the center coordinate point of the intersection.

Figure 9:
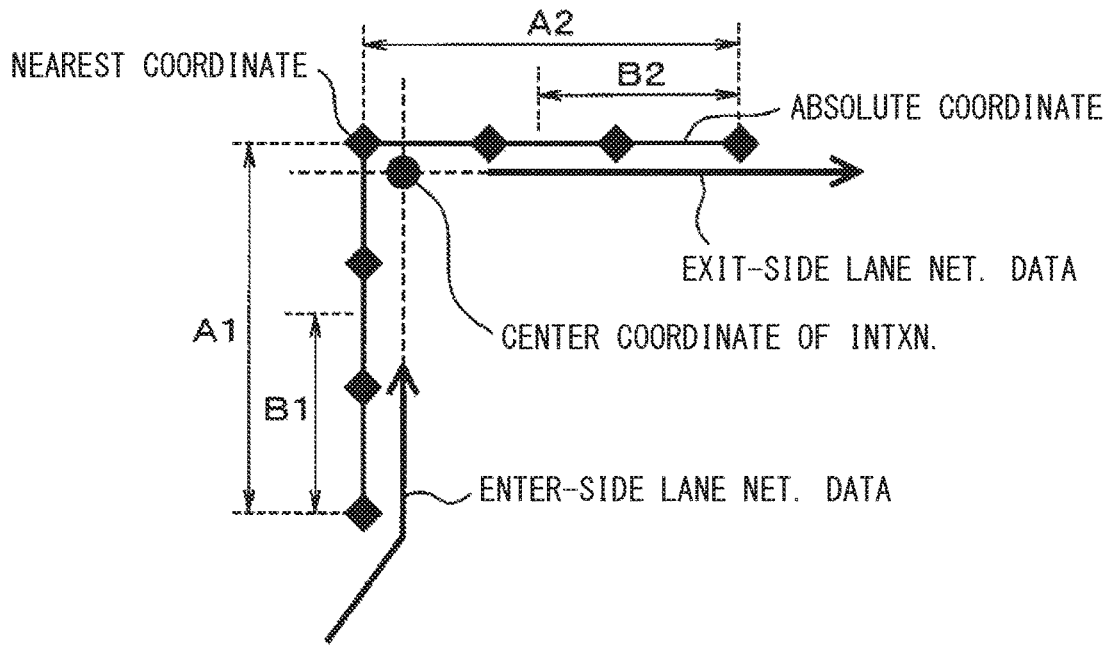
FIG. 9 is a diagram illustrating a manner of setting a trajectory acquisition segment and a fitting segment.

Next, as shown in FIG. 9, the segment setting unit 10 sets a trajectory acquisition segment and a fitting segment for each of an enter-side absolute trajectory and an exit-side of the absolute trajectory wherein the enter-side absolute trajectory is a portion of the absolute trajectory from which the intersection is entered and the exit-side absolute trajectory is a portion of the absolute trajectory to which the intersection is exited (S4, corresponding to a segment setting procedure). Specifically, the segment setting unit 10 sets the trajectory acquisition segment "A1" and the fitting segment "B1" of the enter-side absolute trajectory by using the nearest coordinate point as a reference, and sets the trajectory acquisition segment "A2" and the fitting segment "B2" of the exit-side absolute trajectory by using the nearest coordinate point as a reference. The enter-side trajectory acquisition segment "A1" and the exit-side trajectory acquisition segment "A2" have, for example, "50 meters" long, and the enter-side fitting segment "B1" and the exit-side fitting segment "B2" have, for example, "30 meters" long. The enter-side trajectory acquisition segment "A1" and the exit-side trajectory acquisition segment "A2" may have the same length or different lengths. Also, the enter-side fitting segment "B1" and the exit-side fitting segment "B2" may have the same length or different lengths.

Figure 10:
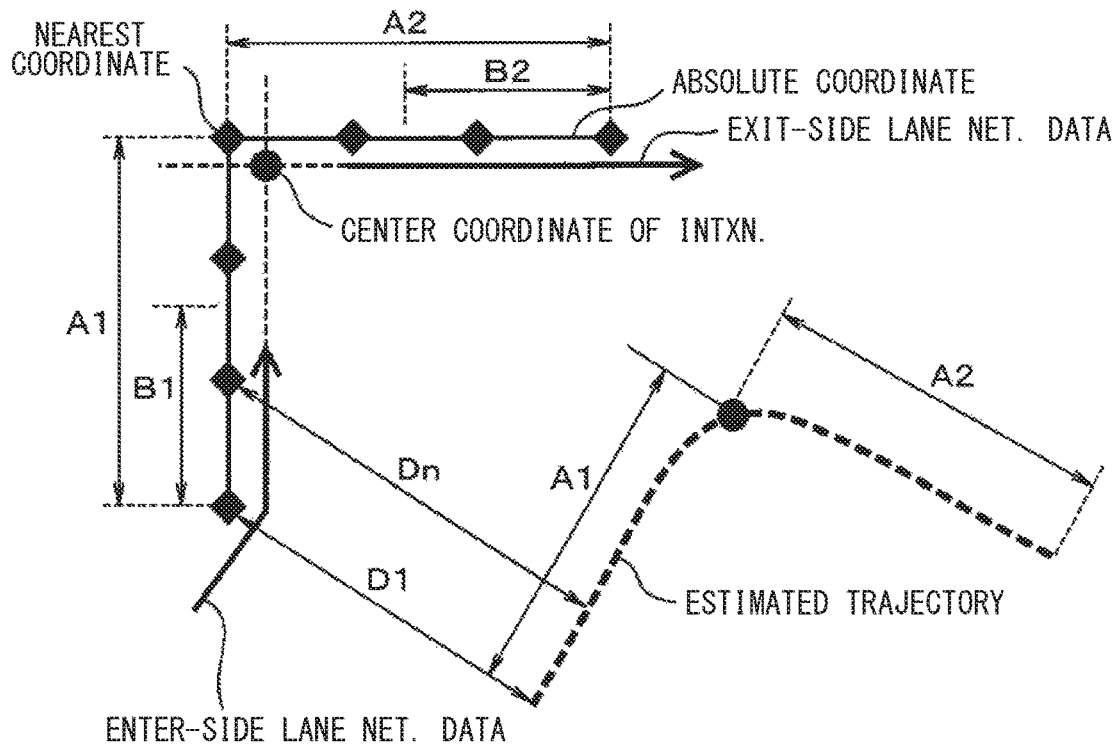
FIG. 10 is a diagram illustrating a manner of calculating an average value of distance differences.

Next, as shown in FIG. 10, the average value calculation unit 11 acquires the estimated trajectory provided from the vehicle, and calculates an average value of distance difference between the fitting segment of the enter-side absolute trajectory set by the segment setting unit 10 and an enter-side estimated trajectory wherein the enter-side estimated trajectory is a portion of the estimated trajectory that corresponds to the fitting segment of the enter-side absolute trajectory (S5, corresponding to an average value calculation procedure). Specifically, the average value calculation unit 11 specifies the enter-side estimated trajectory corresponding to the enter-side absolute trajectory fitting segment "B1", and an average value of distances "D1" to "Dn (n is a natural number)" between the fitting segment "B1" of the enter-side absolute trajectory and the enter-side estimated trajectory.

Figure 11:
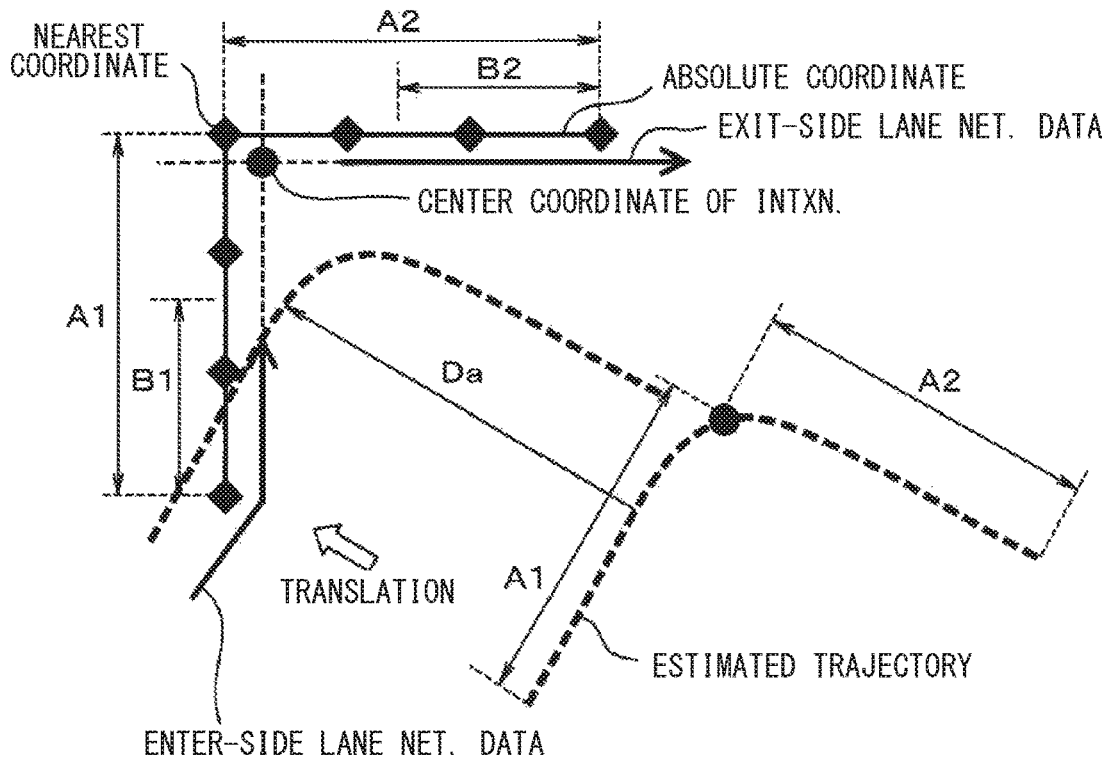
FIG. 11 is a diagram illustrating a manner of translating an estimated trajectory by the average value of distance differences.

Next, as shown in FIG. 11, the first translation unit 12 translates the estimated trajectory I by the average value of the distance differences calculated by the average value calculation unit 11 (S6, corresponding to a first translation process). Specifically, the first translation unit 12 translates the estimated trajectory by the average value "Da" of the distance differences "D1" to "Dn".

Figure 12:
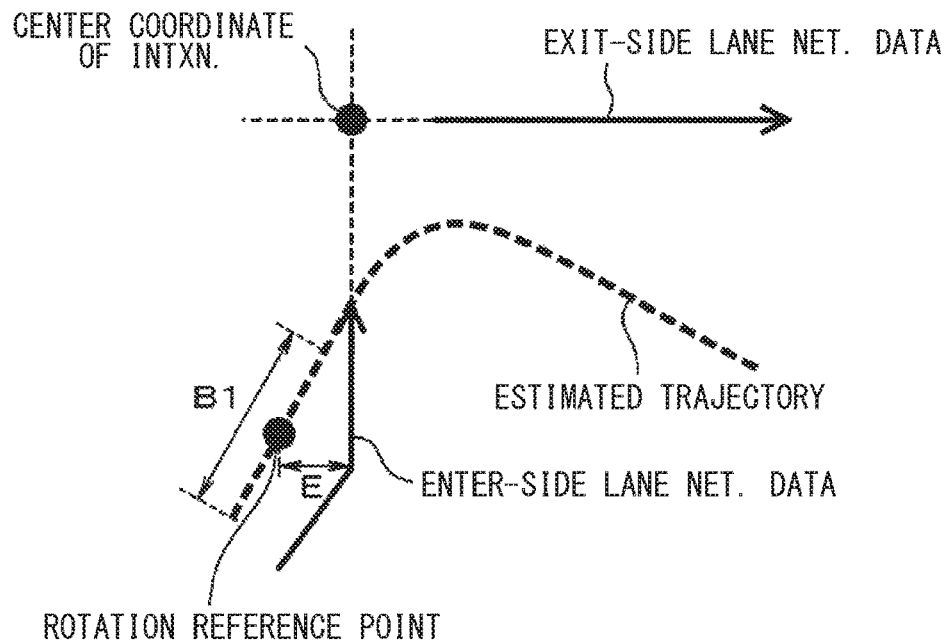
FIG. 12 is a diagram illustrating a manner of calculating a straight line distance.

Next, as shown in FIG. 12, the straight line distance calculation unit 13 calculates a straight line distance from a rotation reference point to the enter-side lane network data, wherein the midpoint of the fitting segment of the enter-side estimated trajectory is set to the rotation reference point (S7, corresponding to a straight line distance calculation process). Specifically, the straight line distance calculation unit 13 calculates the straight line distance "E" from the rotation reference point to the enter-side lane network data.

Figure 13:
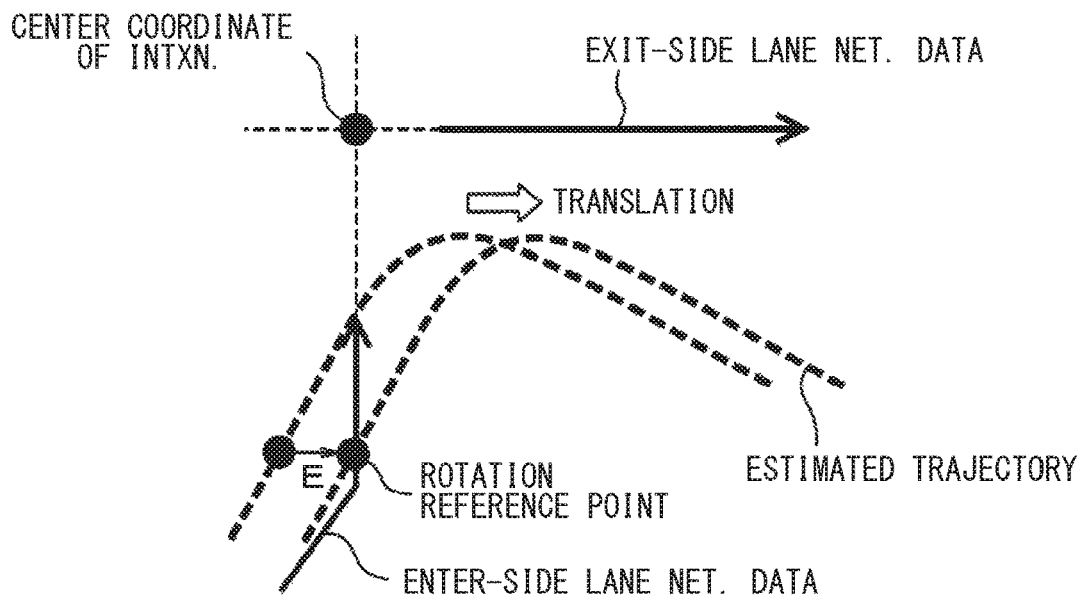
FIG. 13 is a diagram illustrating a manner of translating the estimated trajectory by the straight line distance.

Next, as shown in FIG. 13, the second translation unit 14 translates the estimated trajectory by the straight line distance calculated by the straight line distance calculation unit 13 (S8, corresponding to a second translation process). Specifically, the second translation unit 14 translates the estimated trajectory by the straight line distance "E".

Figure 14:
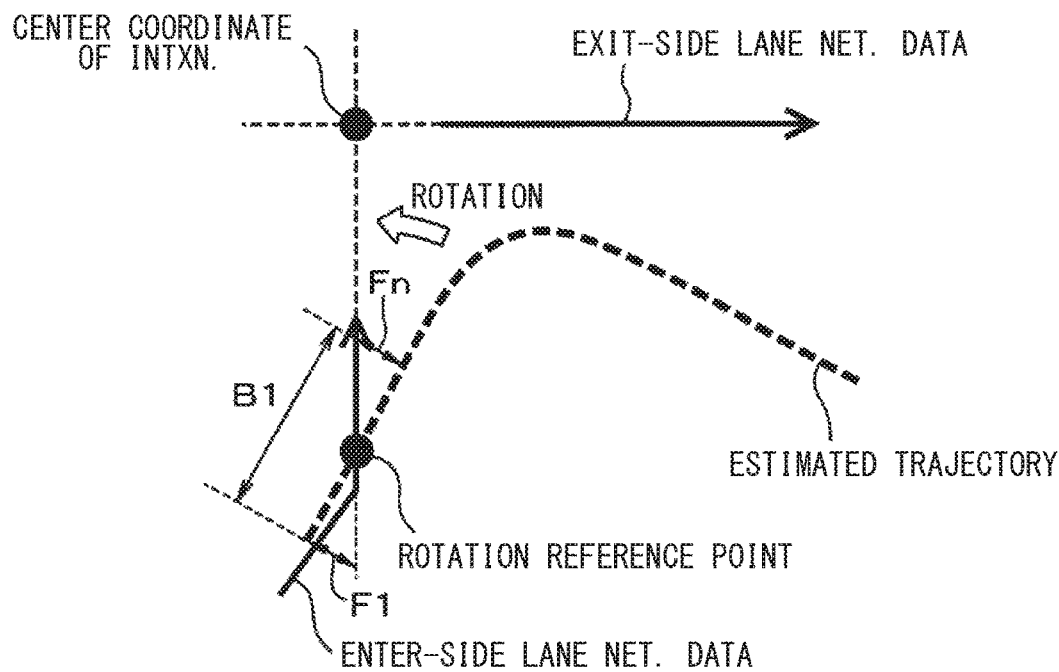
FIG. 14 is a diagram illustrating a manner of rotating the estimated trajectory.

Next, as shown in FIG. 14, the estimated trajectory rotation unit 15 rotates the estimated trajectory so that the distance between the fitting section of the enter-side estimated trajectory and the enter-side network data is minimized (S9, estimation). Corresponds to the trajectory rotation procedure). Specifically, the estimated trajectory rotation unit 15 rotates the estimated trajectory so that the distance difference "F1" to "Fn" between the fitting segment "B1" of the enter-side estimated trajectory and the enter-side lane network data is minimized.

Figure 15:
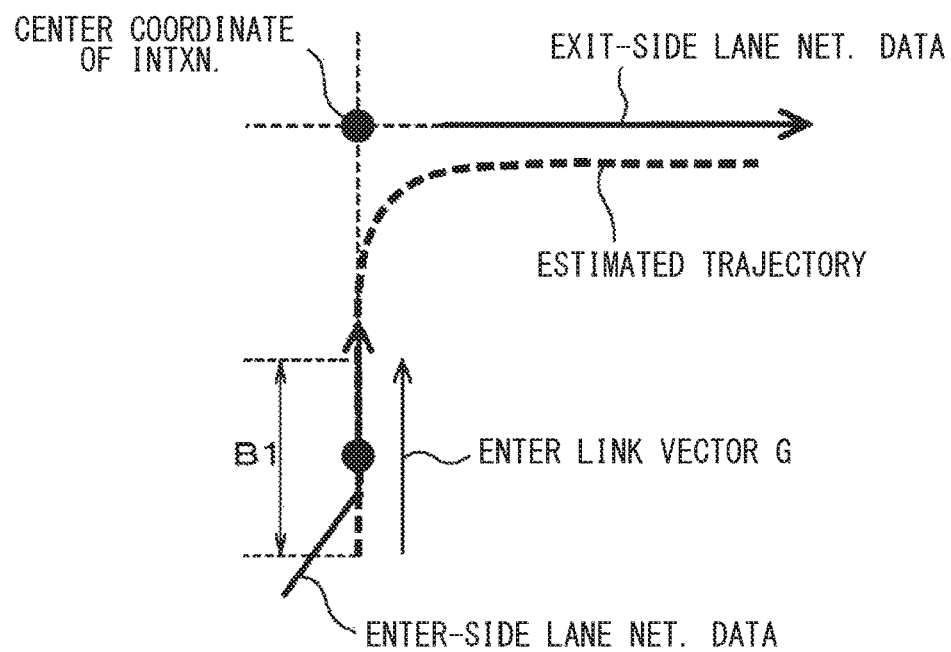
FIG. 15 is a diagram illustrating a manner of setting an enter link vector.

Next, as shown in FIG. 15, the enter link vector setting unit 16 sets an enter link vector which is from the start point to the end point of the fitting segment of the enter-side estimated trajectory (S10, corresponding to an enter link vector setting process). Specifically, the enter link vector setting unit 16 sets the enter link vector "G" which is from the starting point to the ending point of the fitting segment "B1" of the enter-side estimated trajectory.

Figure 16:
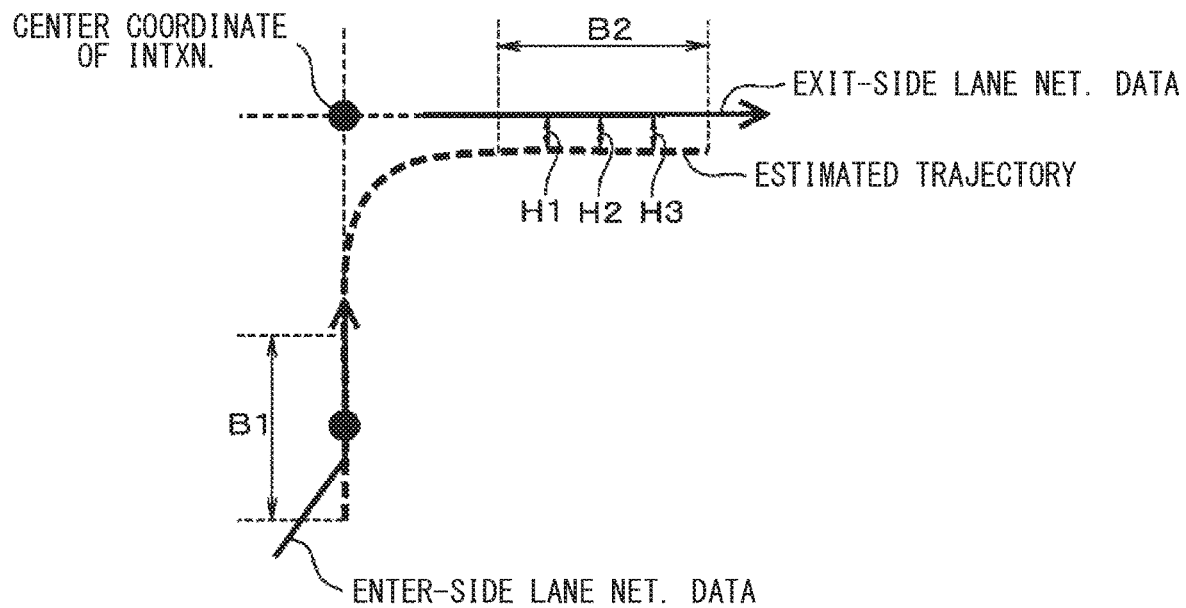
FIG. 16 is a diagram illustrating a manner of translating the estimated trajectory in a direction of the enter link vector.
Figure 17:
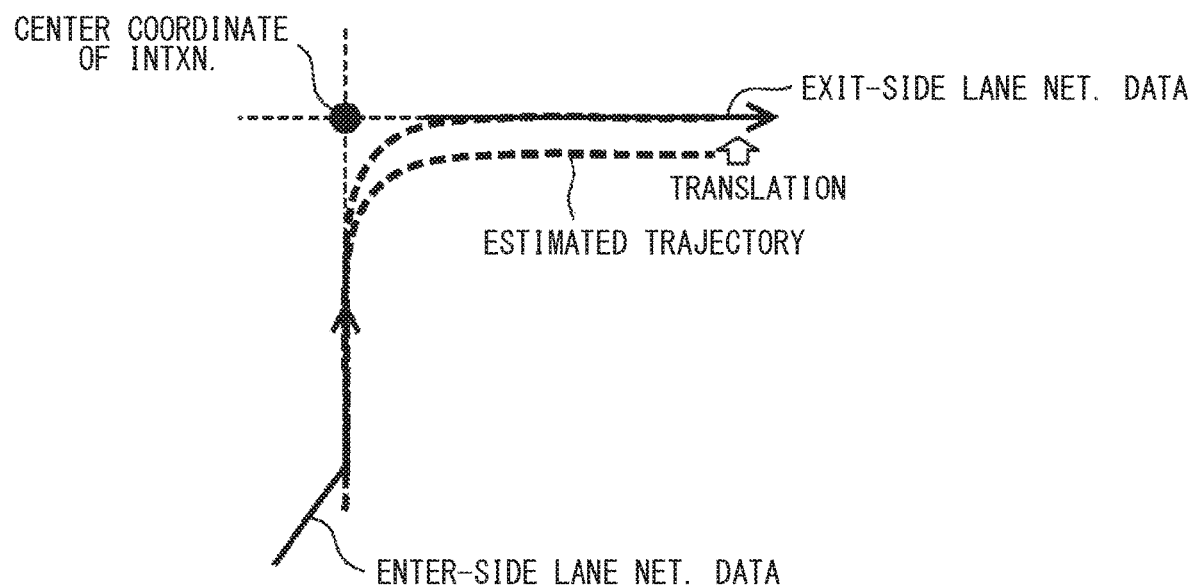
FIG. 17 is a diagram illustrating the estimated trajectory translated in the direction of the enter link vector.

Then, as illustrated in FIG. 16, the third translation unit 17 translates the estimated trajectory in the direction of the enter link vector so that the distance difference between the exit-side estimated trajectory and the exit-side lane network data is minimized (S11, corresponding to a third translation process). Specifically, as shown in FIG. 17, the third translation unit 17 translates the estimated trajectory in the direction of the enter link vector so that the distance difference "H1", "H2", and "H3" between the exit-side estimated trajectory and the exit-side lane network data is minimized.

The travel path data generator 2 performs the above-described series of processes, whereby the travel path data generator 2 generates the data of the travel path inside the intersection by using the absolute trajectory and the estimated trajectory acquired from the vehicle and the lane network data stored in the lane network data storage unit 4 and stores the generated travel path data in the travel path data storage unit 5.

(2) Correct Travel Path Data Selection Processing

Figure 18:
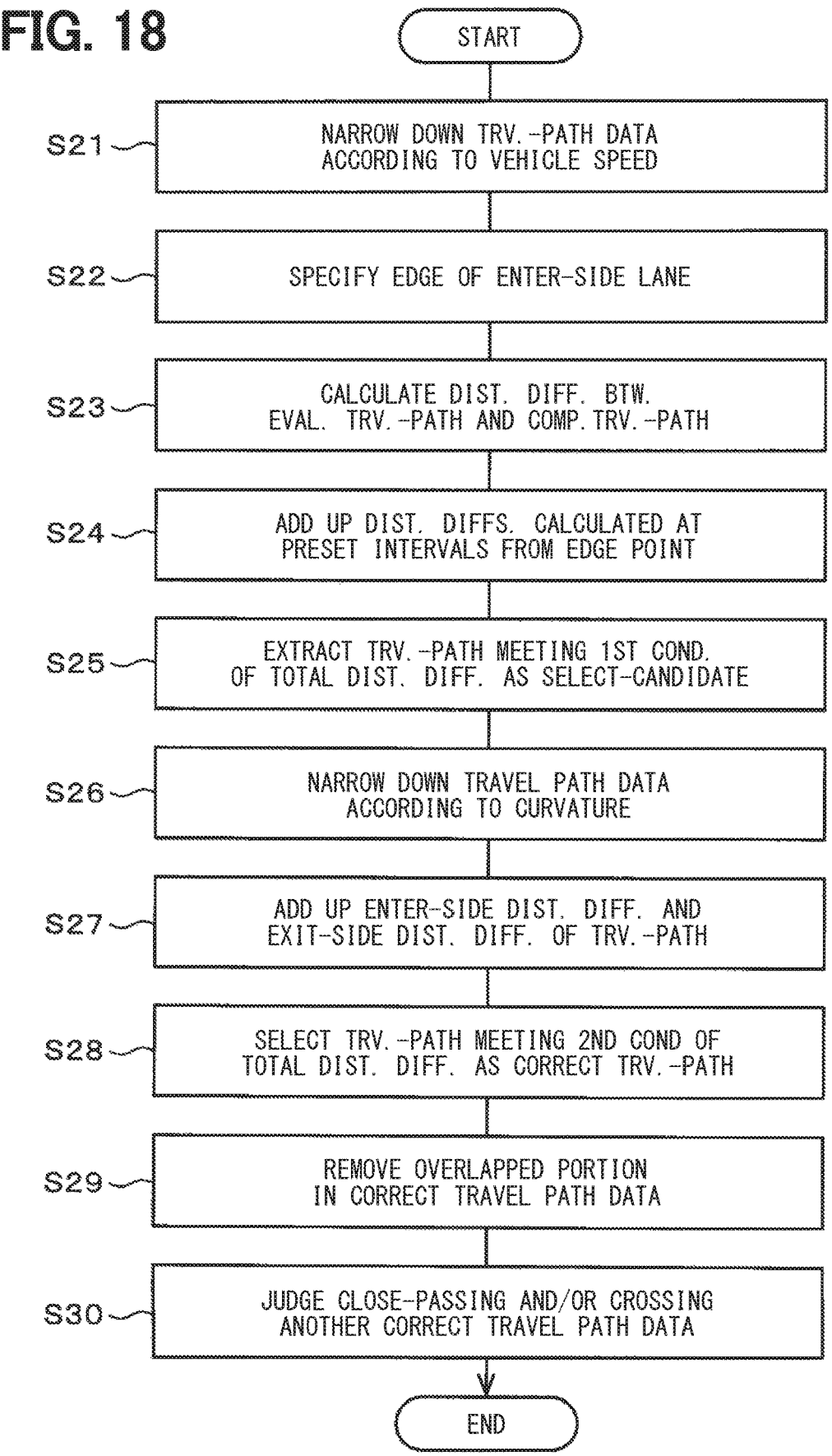
FIG. 18 is a flowchart illustrating a correct travel path data selection process.
Figure 19:
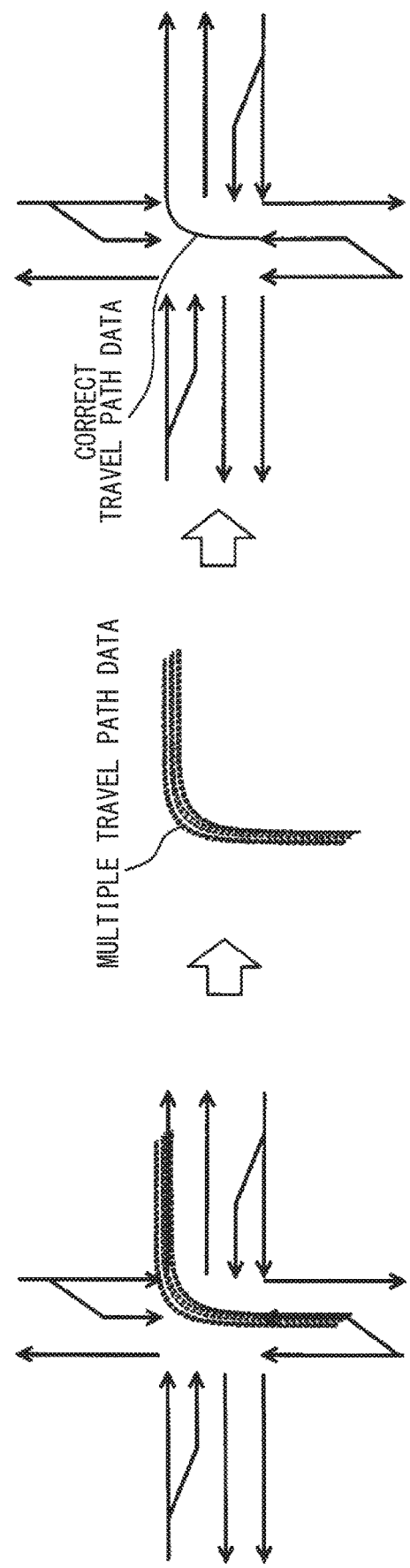
FIG. 19 is a diagram illustrating a manner of selecting correct travel path data.

In the travel path data generation apparatus 1, the correct travel path data selector 3 performs the correct travel path data selecting process shown in FIG. 18 in response to a start event of the correct travel path data selecting process being met. As shown in FIG. 19, the correct travel path data selector 3 receives inputs of the data of multiple travel paths stored in the travel path data storage unit 5, and selects data of a correct travel from the multiple travel paths and outputs the selected correct path data. Hereinafter, processing executed by a respective functional block of the correct travel path data selector 3 will be described.

Figure 20:
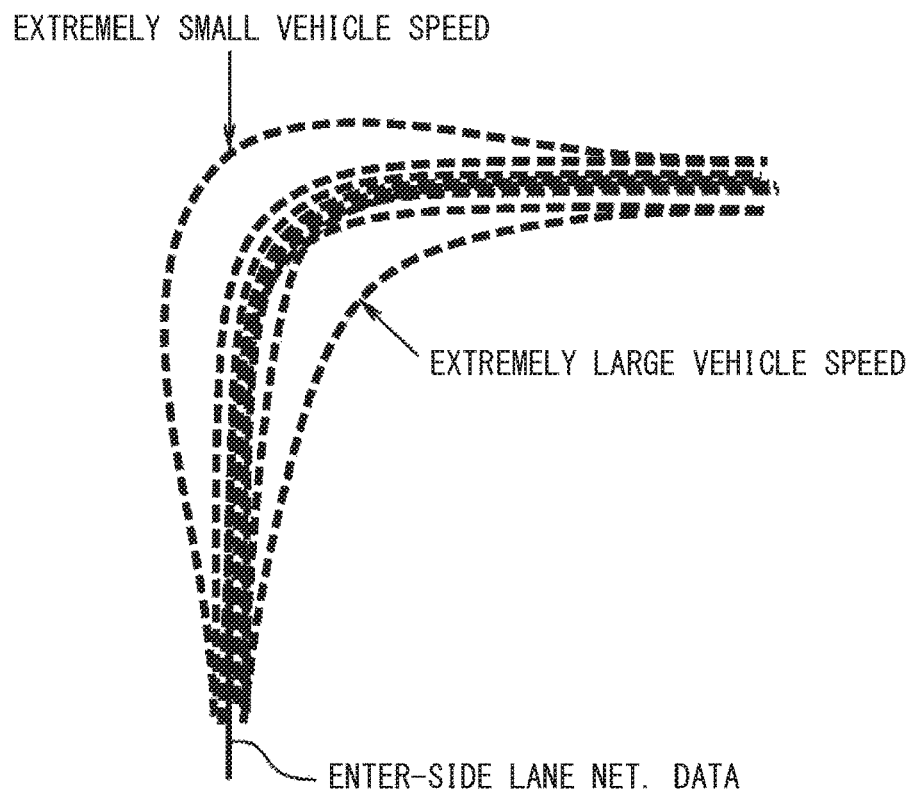
FIG. 20 is a diagram illustrating a manner of narrowing down travel path data according to vehicle speed.
Figure 21:
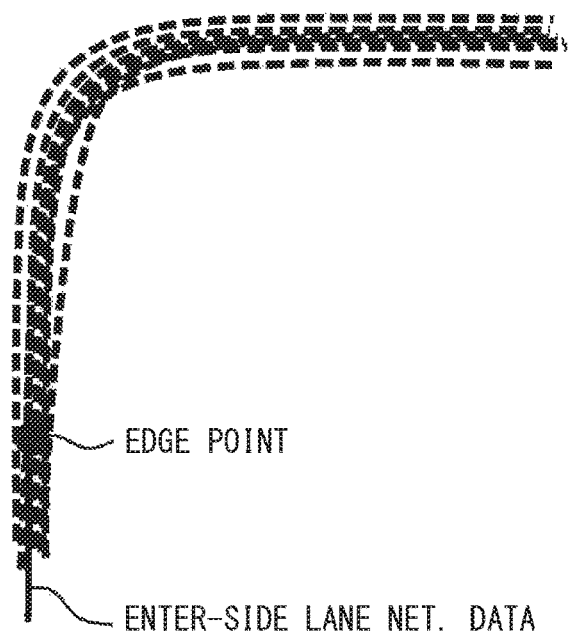
FIG. 21 is a diagram illustrating a manner of specifying an edge point of enter-side lane network data.

First, as shown in FIG. 20, the first narrow-down unit 18 narrows down the data of multiple travel paths according to vehicle speed (S21, corresponding to a first narrow-down process). Specifically, the first narrow-down unit 18 excludes, as an exception, the data of a travel path data generated based on an extremely high vehicle speed vehicle or the data of a travel path data generated based on an extremely low vehicle speed vehicle, from the data of multiple travel paths. Next, as shown in FIG. 21, the edge point specifying unit 19 specifies an edge point of the enter-side lane network data (S22, corresponding to an edge point specifying process).

Figure 22:
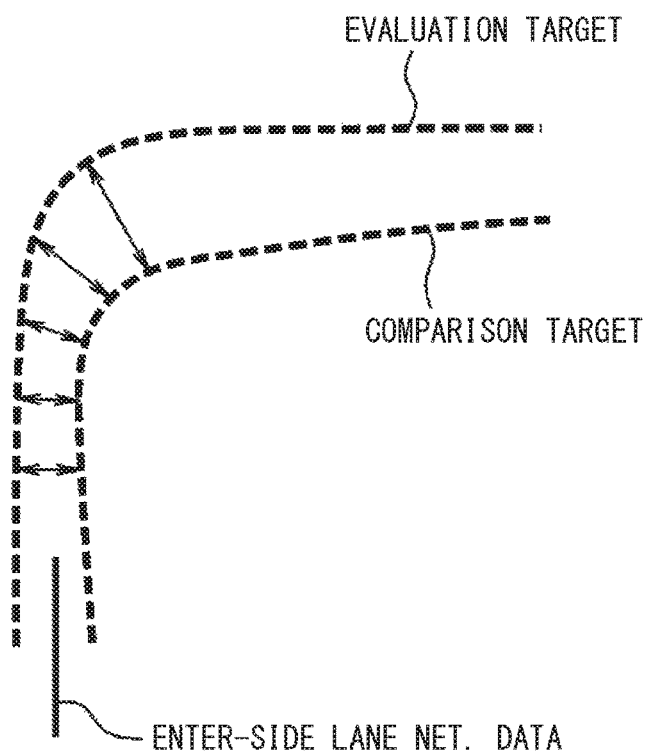
FIG. 22 is a diagram illustrating a manner of calculating distance differences up to a calculation segment.

Next, as shown in FIG. 22, from among the data of travel paths, the distance difference calculation unit 20 selects the data of one travel path data as an evaluation target and selects the data of all the rest of travel paths data as comparison target(s). The distance difference calculation unit 20 calculates, at predetermined intervals from the edge point specified by the edge point specifying unit 19 up to a calculation segment, distance difference between the travel path data of the evaluation target and the travel path data of the comparison target (S23, corresponding to a distance difference calculation process). The predetermined interval is "1 meter", for example.

Figure 23:
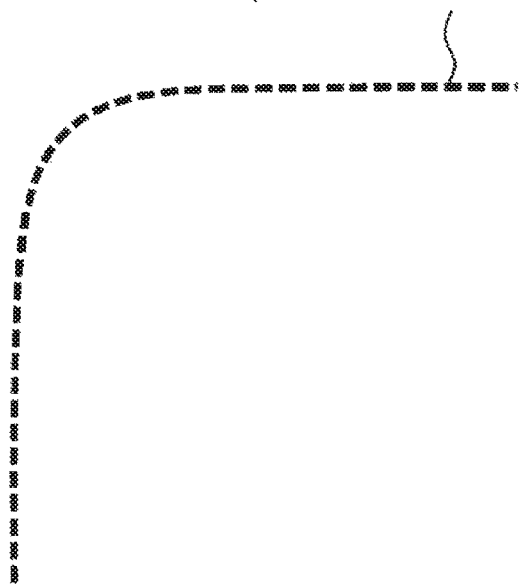
FIG. 23 is a diagram illustrating a manner of calculating a distance difference total value.
Figure 24:
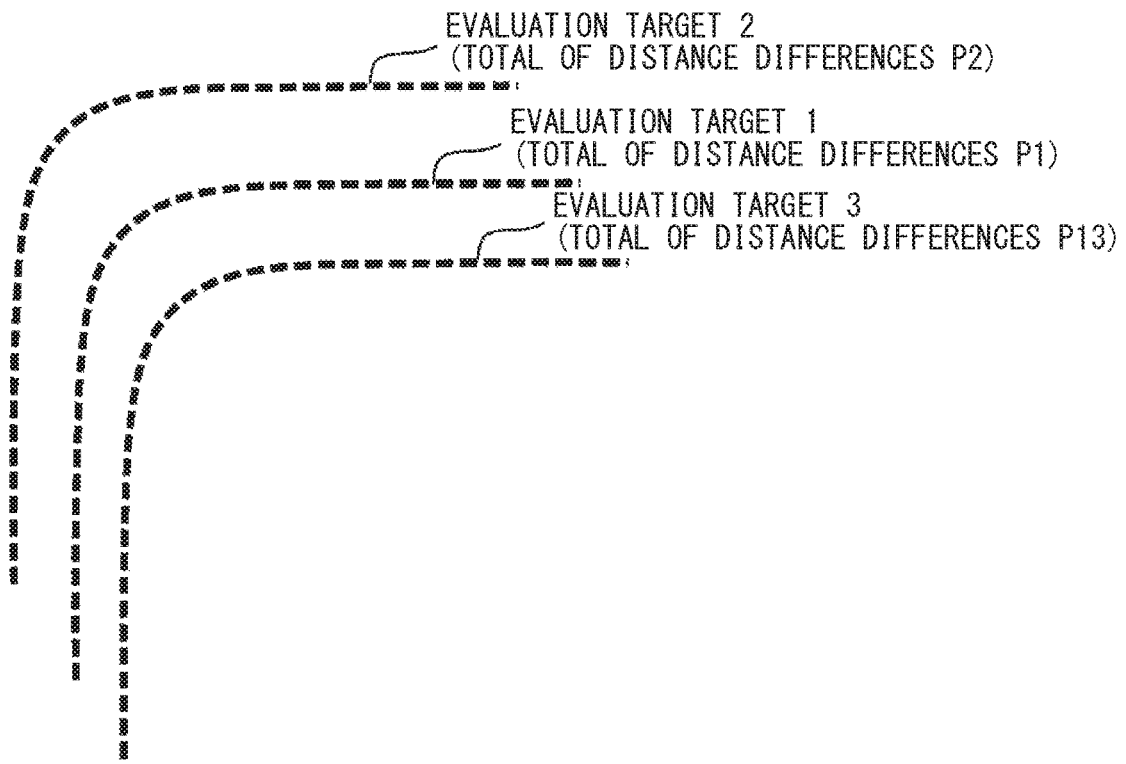
FIG. 24 is a diagram illustrating a manner of calculating a total value of distance differences.

Next, the first total value calculation unit 21 calculates the total value of the distance differences calculated at the predetermined intervals from the edge point (S24, corresponding to a first total value calculation process). The first total value calculation unit 21 changes the evaluation target and calculates the total value of the distance differences for all of the data of travel paths, as shown in FIGS. 23 and 24.

Figure 25:
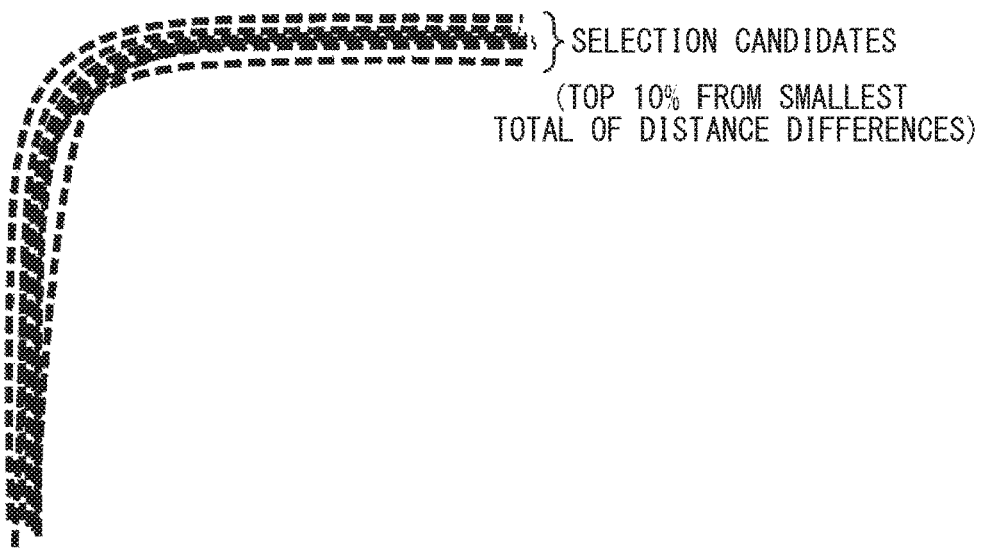
FIG. 25 is a diagram illustrating an extraction manner in which travel path data for which a total value of distance differences satisfies a first predetermined condition is extracted as a selection candidate.

Next, as shown in FIG. 25, from the data of travel paths, the selection candidate extraction unit 22 extracts the data of certain travel paths as selection candidates wherein the extracted selection candidate is the data of a travel path of which the total value of the distance differences calculated by the first total value calculation unit 21 satisfies a first predetermined condition (S25, corresponding to a selection candidate extraction process). The first predetermined condition is, for example, such that the selection candidates belong to 10% of the data of travel paths and each have the total value of distance differences smaller than the rest 90% of travel paths.

Figure 26:
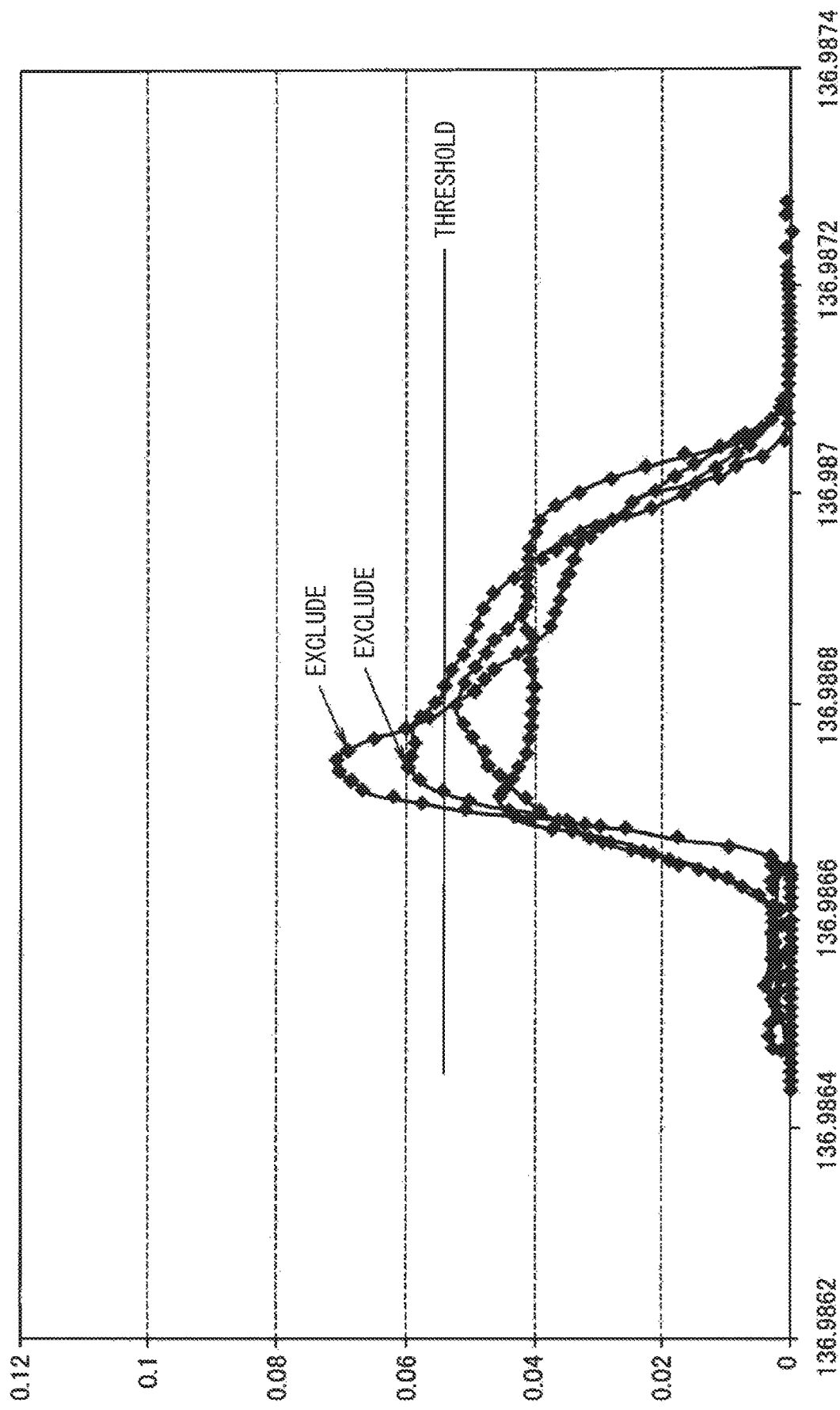
FIG. 26 is a diagram illustrating a manner of narrowing down travel path data according to curvature.

Next, as shown in FIG. 26, the second narrow-down unit 23 narrows down the data of travel paths extracted as the selection candidates by the selection candidate extraction unit 22, wherein the narrow down is made according to travel path curvature (S26, corresponding to a second narrow-down process). Specifically, the second narrow-down unit 23 excludes, as an exception, the data of a travel path whose curvature partially exceeds a threshold value, from the data of travel paths, thereby narrowing down the data of travel paths extracted as the selection candidates.

Figure 27:
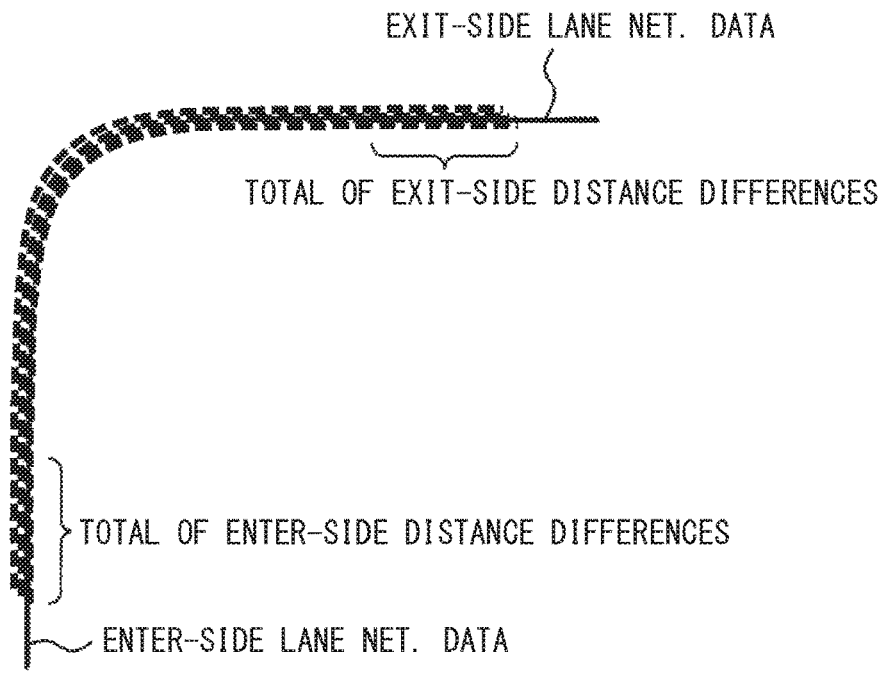
FIG. 27 is a diagram illustrating a manner of calculating a total value of an enter-side distance difference and an exit-side distance difference.

Next, as shown in FIG. 27, by using the data of travel paths provided by the narrow down by the second narrow-down unit 23, the second total value calculation unit 24 calculates a total value of an enter-side distance difference and an exit-side distance difference wherein the enter-side distance difference is a distance difference between the data of an enter-side travel path data and the enter-side lane network data on the enter side of the intersection and the exit-side distance difference is a distance difference between the data of an exit-side travel path data and the exit-side lane network data on the exit side of the intersection (S27, corresponding to a second total value calculation process).

Figure 28:
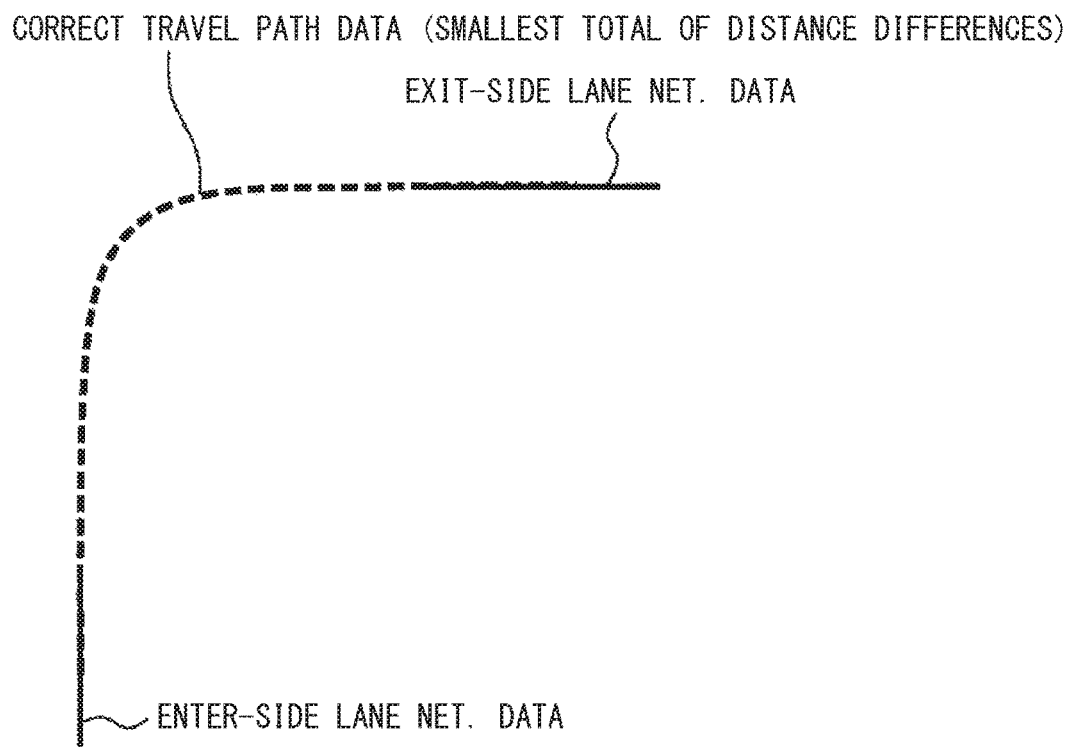
FIG. 28 is a diagram illustrating a selection manner in which travel path data for which a total value satisfies a predetermined condition is selected as correct travel path data.

Next, as shown in FIG. 28, from the data of travel paths selected as the selection candidates, the selecting unit 25 selects the data of a correct travel path which the data of a travel path of which the total value of the enter-side distance difference and the exit-side distance difference satisfies a second predetermined condition (S28, corresponding to a selecting process). The second predetermined condition is, for example, such that the total value of the enter-side distance difference and the exit-side distance difference is the smallest.

Figure 29:
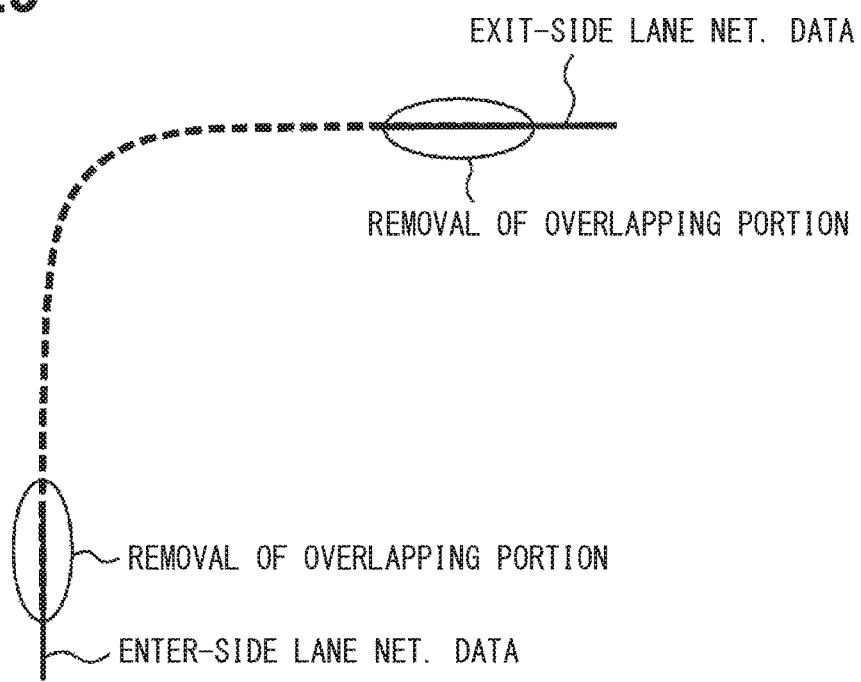
FIG. 29 is a diagram illustrating a manner of removing an overlapping portion.
Figure 30:
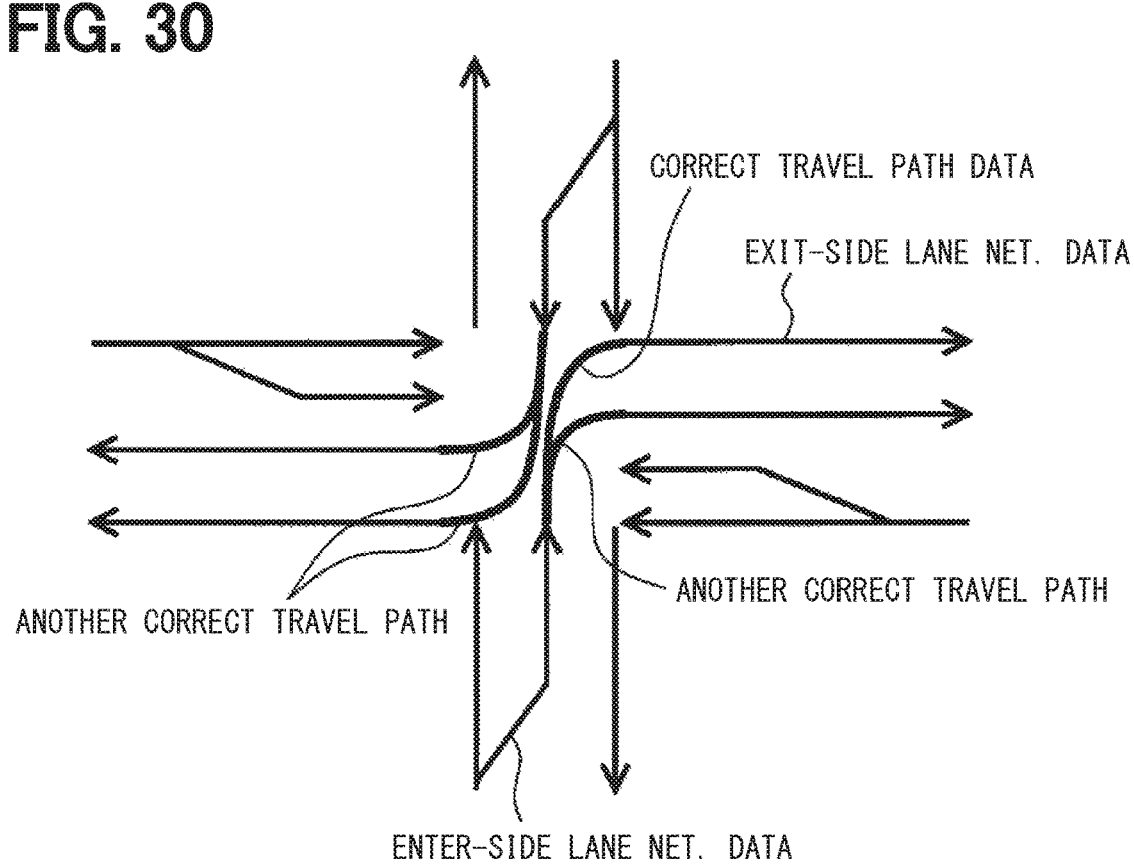
FIG. 30 is a diagram illustrating a manner of judging close-passing and/or crossing.

Next, as shown in FIG. 29, the overlapping portion removing unit 26 removes portions of the correct travel path data selected by the selecting unit 25, wherein the removed portions are portions overlapping the enter-side lane network data and the exit-side lane network data (S29, corresponding to an overlapping portion removing process). Specifically, the overlapping portion removing unit 26 smooths a connection point between the correct travel path data and the enter-side lane network data, and smooths a connection point between the correct travel path data and the exit-side lane network data.

Thereafter, the close-passing crossing judgement unit 27 judges one correct travel path passing close to and/or crossing another correct travel path (S30, corresponding to a close-passing crossing judgement process). Specifically, the close-passing crossing judgement unit 27 determines a possibility of vehicle collision by judging one correct travel path passing close to and/or crossing another correct travel path.

The correct travel path data selector 3 performs the above-described series of processes, whereby the correct travel path data selector 3 selects the correct travel path data from among the data of multiple travel paths stored in the travel path data storage unit 5 and stores the selected correct travel path data in the correct travel path data storage unit 6.

The present embodiment described above provides the following effects. To generate the travel path data by the travel path data generation apparatus 1, the estimated trajectory of the vehicle when the vehicle actually traveled in the intersection is fitted to the lane network data connected to the intersection by using the absolute trajectory. Because of the fitting of the estimated trajectory of actual traveling of the vehicle inside the intersection into the lane network data by using the absolute trajectory, it is possible to optimize the connection between the data of the travel path inside the intersection and the lane network data connected to the intersection. As a result, it is possible to appropriately generate the data of travel paths inside intersections for automated driving.

Further, from among the data of a plurality of the travel paths, the travel path data generation apparatus 1 selects the data of a correct travel path as the correct travel path data. Specifically, when the data of a plurality of the travel paths are generated, not all the travel paths may be appropriate, and there is a possibility that an incorrect travel path may be generated. However, because of selecting the correct travel path data, it is possible to select appropriate travel path data.

Although the present disclosure has been described with reference to embodiments, it is to be understood that the disclosure is not limited to the embodiments and structures. The present disclosure encompasses various modification examples and modifying within an equivalent range. In addition, various combinations and forms, and other combinations and forms, including only a single element or more elements or less, are also within the scope and spirit of the present disclosure.

The process of narrowing down the data of multiple travel paths according to vehicle speed by the first narrow-down unit 18 and/or the process of narrowing down the data of multiple travel pats according to travel path curvature by the second narrow-down unit 23 are performable at desired timings. Specifically, immediately after performing the process of narrowing down the data of travel paths according to vehicle speed, the process of narrowing down the travel paths according to travel path curvature may be performed. These processes may be omitted.

Figure 31:
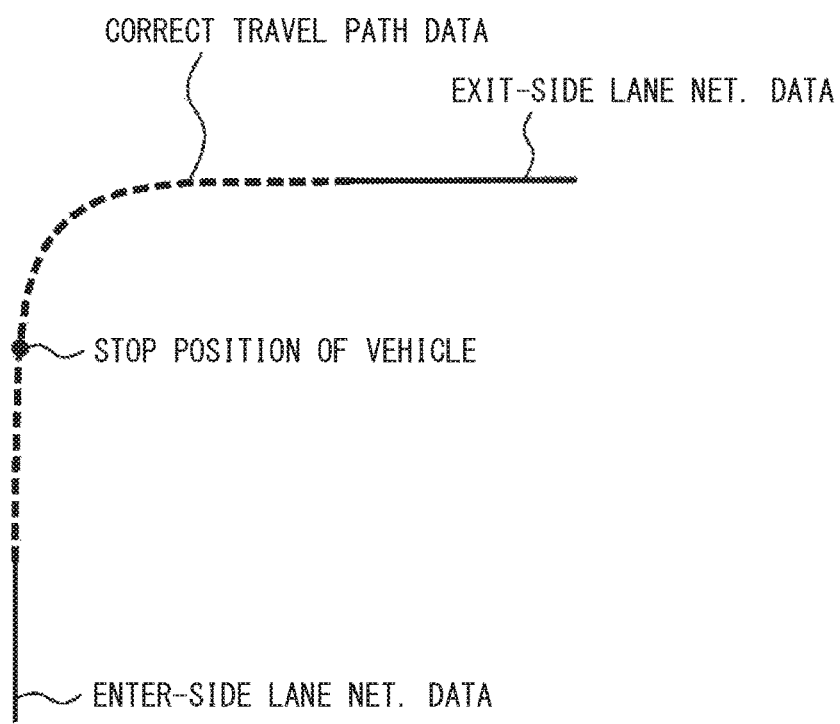
FIG. 31 is a diagram illustrating a manner of adding information on a stop position for a vehicle.

When selecting the correct travel path data, the correct travel path data selector 3 may add additional information to the correct travel path data. Specifically, as shown in FIG. 31, by using vehicle speeds used as criterions in narrowing down the data of travel paths according to vehicle speed, the correct travel path data selector 3 may specify a stop position of the vehicle inside the intersection by using the vehicle speed data which is used as the criterion in narrowing down the data of travel paths according to vehicle speed. The correct travel path data selector 3 may add information on the specified stop position of the vehicle to the correct travel path data.

Figure 32:
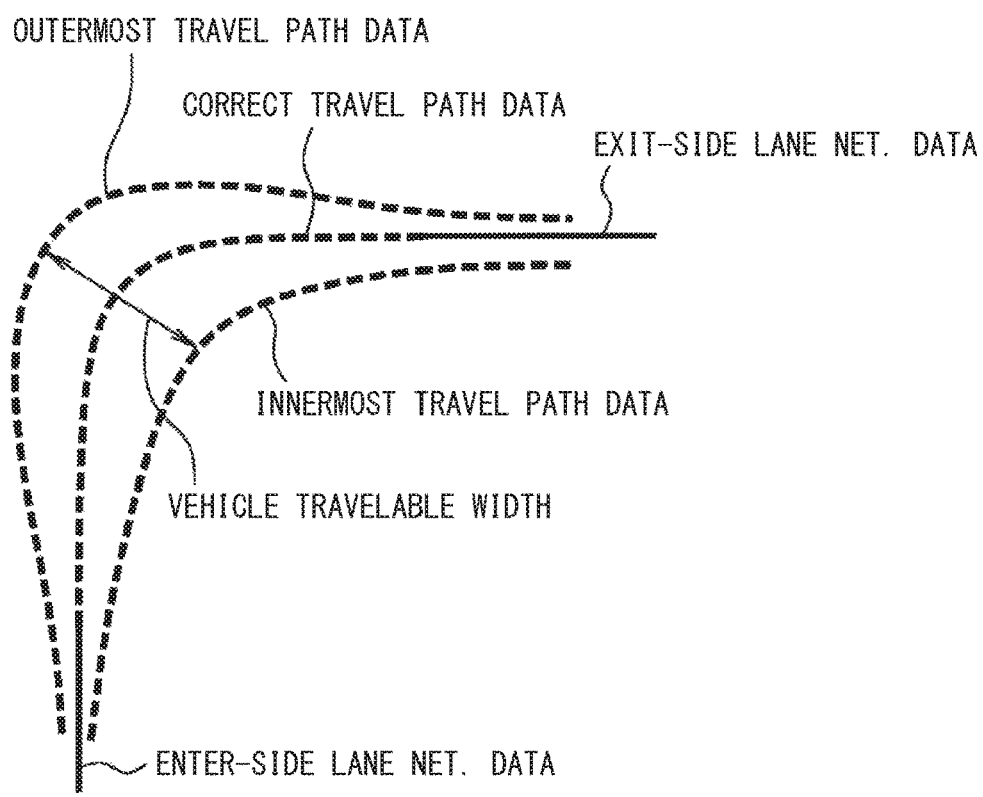
FIG. 32 is a diagram illustrating a manner of adding information on a travelable width of a vehicle.

As shown in FIG. 32, the correct travel path data selector 3 may specify, as a vehicle travelable width, an area between the data of a travel path passing most inward in the intersection and the data of a travel path passing most outward in the intersection among the data of multiple travel paths, and may add the information on the specified vehicle travelable width to the correct travel path data. By providing a margin, the correct travel path data selector 3 mat specify the vehicle travelable width smaller than the area between the travel path data passing through the innermost and the travel path data passing through the outermost. Further, the correct travel path data selector 3 specifies only the inner travelable range based on the travel path data that passes through the innermost side, and adds information on the specified inner travelable range to the correct travel path data. Alternatively, only the outer travelable range may be specified by the travel path data that passes through the outermost side, and information regarding the specified outer travelable range may be added to the correct travel path data.

What is claimed is:

1. A travel path data generation apparatus for generating data of a travel path inside an intersection for automated driving of a vehicle, comprising:

a computer including a processor and a memory,
the memory storing a program configured to, when executed by the processor, cause the processor to:
read lane network data that is data of travel paths outside the intersection;
specify enter-side lane network data representing lane network from which the intersection is entered, and exit-side lane network data representing lane network to which the intersection is exited based on the lane network that is read;
specify an intersecting point between an extended line of the enter-side lane network data and an extended line of the exit-side lane network data as a center coordinate point of the intersection;
acquire, as an absolute trajectory, a global positioning system (GPS) trajectory representing GPS positions during actual traveling of the vehicle inside the intersection;
specify, as a nearest coordinate point, a coordinate point nearest to the center coordinate point of the intersection among a plurality of coordinate points forming the absolute trajectory;
set a trajectory acquisition segment and a fitting segment for each of an enter-side absolute trajectory and an exit-side absolute trajectory based on the nearest coordinate point, wherein the enter-side absolute trajectory is an enter-side portion of the absolute trajectory and the exit-side absolute trajectory is an exit-portion of the absolute trajectory;
acquire an estimated trajectory represented by sensor values of a gyro sensor during the actual traveling of the vehicle inside the intersection;
calculate an average value of distance differences between the fitting segment of the enter-side absolute trajectory and an enter-side estimated trajectory, wherein the enter-side estimated trajectory is a portion of the estimated trajectory that corresponds to the fitting segment of the enter-side absolute trajectory;
translate the estimated trajectory by the average value of the distance differences;
calculate a straight line distance from a rotation reference point to the enter-side lane network data, wherein the rotation reference point is set as an intermediate point of the fitting segment of the enter-side estimated trajectory;
translate the estimated trajectory by the straight line distance;
rotate the estimated trajectory so that a distance difference between the fitting segment of the enter-side estimated trajectory and the enter-side lane network data is minimized;
set an enter link vector which is from a start point to an end point of the fitting segment of the enter-side estimated trajectory;
translate the estimated trajectory in a direction of the enter link vector so that a distance difference between the exit-side estimated trajectory and the exit-side lane network data is minimized; and
generate the data of the travel path inside the intersection for automated driving of the vehicle based on the estimated trajectory that is translated in the direction of the enter link vector.

2. The travel path data generation apparatus according to claim 1, wherein the program is further configured to, when executed by the processor, cause the processor to select data of a correct travel path as correct travel path data from among the data of a plurality of travel paths generated by the processor.

3. The travel path data generation apparatus according to claim 2,
wherein the program is further configured to, when executed by the processor, cause the processor to:
specify an edge point of the enter-side lane network data;
select data of one travel path from the data of the plurality of travel paths, as an evaluation target and select data of all the rest of the travel paths as a comparison target, and calculate, at predetermined intervals from the edge point to a calculation segment, distance differences between the evaluation target and the comparison target;
calculate a total value of the distance differences calculated at the predetermined intervals from the edge point;
extract as a selection candidate the data of a travel path of which the total value of the distance differences satisfies a first predetermined condition from the data of travel paths;
calculate a total value of: an enter-side distance difference between the enter-side lane network data and an enter-side travel path data being an intersection-enter-side portion of the data of the travel path selected as the selection candidate; and an exit-side distance difference between the exit-side lane network data and an exit-side travel path data being an intersection-exit-side portion of the data of the travel path selected as the selection candidate;
select the data of a correct travel path which is the data of a travel path of which the total value of the enter-side distance difference and the exit-side distance difference satisfies a second predetermined condition from the data of travel paths selected as the selection candidates;
remove the data of a portion of the correct travel path data, the portion overlapping the enter-side lane network data and the exit-side lane network data; and
judge the correct travel path data passing close to and/or crossing another correct path data.

4. The travel path data generation apparatus according to claim 2,
wherein the program is further configured to, when executed by the processor, cause the processor to narrow down the data of a plurality of travel paths according to vehicle speed.

5. The travel path data generation apparatus according to claim 2 wherein the program is further configured to, when executed by the processor, cause the processor to narrow down the data of a plurality of travel paths according to curvature.

6. The travel path data generation apparatus according to claim 2
wherein the program is further configured to, when executed by the processor, cause the processor to add additional information to the correct travel path data when selecting the correct travel path data.

7. A computer-readable non-transitory storage medium storing a travel path data generation program for a computer to generate data of a travel path inside an intersection for automated driving,
the program causing the computer to perform:
reading lane network data that is data of travel paths outside the intersection;
specifying an enter-side lane network data representing lane network from which the intersection is entered, and exit-side lane network data representing lane network to which the intersection is exited based on the lane network that is read;

specifying an intersecting point between an extended line of the enter-side lane network data and an extended line of the exit-side lane network data as a center coordinate point of the intersection;

acquiring, as an absolute trajectory, a global positioning system (GPS) trajectory representing GPS positions during actual traveling of the vehicle inside the intersection;

specifying, as a nearest coordinate point, a coordinate point nearest to the center coordinate point of the intersection among a plurality of coordinate points forming the absolute trajectory;

for each of an enter-side absolute trajectory and an exit-side absolute trajectory, setting a trajectory acquisition segment and a fitting segment based on the nearest coordinate point, wherein the enter-side absolute trajectory is an enter-side portion of the absolute trajectory and the exit-side absolute trajectory is an exit-portion of the absolute trajectory;

acquiring an estimated trajectory represented by sensor values of a gyro sensor during the actual traveling of the vehicle;

calculating an average value of distance difference between the fitting segment of the enter-side absolute trajectory and an enter-side estimated trajectory, wherein the enter-side estimated trajectory is a portion of the estimated trajectory that corresponds to the fitting segment of the enter-side absolute trajectory;

translating the estimated trajectory by the average value of the distance difference;

calculating a straight line distance from a rotation reference point to the enter-side lane network data, wherein the rotation reference point is set as an intermediate point of the fitting segment of the enter-side estimated trajectory;

translating the estimated trajectory by the straight line distance;

rotating the estimated trajectory so that a distance difference between the fitting segment of the enter-side estimated trajectory and the enter-side lane network data is minimized;

setting an enter link vector which is from a start point to an end point of the fitting segment of the enter-side estimated trajectory;

translating the estimated trajectory in a direction of the enter link vector so that a distance difference between the exit-side estimated trajectory and the exit-side lane network data is minimized; and generating the data of the travel path inside the intersection for automated driving based on the estimated trajectory that is translated in the direction of the enter link vector.

8. The travel path data generation program according to claim 7, the program causing the computer to perform:

specifying an edge point of the enter-side lane network data;

from the data of a plurality of the travel paths, selecting data of one travel path as an evaluation target and selecting data of the rest of the travel paths as a comparison target, and calculating, at predetermined intervals from the edge point to a calculation segment, distance differences between the evaluation target and the comparison target;

calculating a total value of the distance differences calculated at the predetermined intervals from the edge point;

from the data of travel paths, extracting as a selection candidate the data of a travel path of which the total value of the distance differences satisfies a first predetermined condition;

calculating a total value of: an enter-side distance difference between the enter-side lane network data and an enter-side travel path data being an intersection-enter-side portion of the data of the travel path selected as the selection candidate; and an exit-side distance difference between the exit-side lane network data and an exit-side travel path data being an intersection-exit-side portion of the data of the travel path selected as the selection candidate;

from the data of travel paths selected as the selection candidates, selecting the data of a correct travel path which is the data of a travel path of which the total value of the enter-side distance difference and the exit-side distance difference satisfies a second predetermined condition;

removing the data of a portion of the correct travel path data, wherein the potion to be removed is a portion overlapping the enter-side lane network data and the exit-side lane network data; and judging the correct travel path data passing close to and/or crossing another correct path data.

\* \* \* \* \*